(12) United States Patent
Holson

(10) Patent No.: US 12,070,859 B2
(45) Date of Patent: *Aug. 27, 2024

(54) ROBOT BASE POSITION PLANNING

(71) Applicant: Google LLC, Mountain View, CA (US)

(72) Inventor: Benjamin Holson, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/934,877

(22) Filed: Sep. 23, 2022

(65) Prior Publication Data

US 2023/0015796 A1    Jan. 19, 2023

Related U.S. Application Data

(63) Continuation of application No. 16/204,118, filed on Nov. 29, 2018, now Pat. No. 11,465,279.

(51) Int. Cl.
  *B25J 9/16*    (2006.01)
  *G05D 1/00*    (2024.01)

(52) U.S. Cl.
  CPC ............ *B25J 9/162* (2013.01); *G05D 1/0088* (2013.01); *G05D 1/0246* (2013.01)

(58) Field of Classification Search
  None
  See application file for complete search history.

(56) References Cited

U.S. PATENT DOCUMENTS

| | | | |
|---|---|---|---|
| 8,373,801 B1 | 2/2013 | Mogre et al. | |
| 9,205,562 B1 | 12/2015 | Konolige et al. | |
| 10,131,053 B1 | 11/2018 | Sampedro et al. | |
| 2007/0193798 A1 | 8/2007 | Allard et al. | |
| 2013/0147944 A1 | 6/2013 | Zhang et al. | |
| 2014/0088763 A1 | 3/2014 | Hazan | |
| 2014/0350839 A1 | 11/2014 | Pack et al. | |
| 2016/0307360 A1 | 10/2016 | Wiemker et al. | |
| 2017/0314930 A1 | 11/2017 | Monterroza et al. | |

(Continued)

OTHER PUBLICATIONS

Cooperstock et al., "Self-supervised learning for docking and target reaching," Robotics and Autonomous Systems, 1993, pp. 243-260, vol. 11, No. 3/4.

(Continued)

*Primary Examiner* — Jaime Figueroa
*Assistant Examiner* — Arslan Azhar
(74) *Attorney, Agent, or Firm* — McDonnell Boehnen Hulbert & Berghoff LLP

(57) ABSTRACT

A method includes receiving sensor data representative of surfaces in a physical environment containing an interaction point for a robotic device and determining, based on the sensor data, a height map of the surfaces in the physical environment. The method also includes determining, by inputting the height map and the interaction point into a pre-trained model, one or more candidate positions for a base of the robotic device to allow a manipulator of the robotic device to reach the interaction point. The method additionally includes determining a collision-free trajectory to be followed by the manipulator of the robotic device to reach the interaction point when the base of the robotic device is positioned at a selected candidate position of the one or more candidate positions and, based on determining the collision-free trajectory, causing the base of the robotic device to move to the selected candidate position within the physical environment.

20 Claims, 9 Drawing Sheets

(56) References Cited

U.S. PATENT DOCUMENTS

2019/0337154 A1 11/2019 Holson
2020/0380779 A1 12/2020 Khazov et al.

OTHER PUBLICATIONS

He et al., "Confidence Intervals for Neural Networks and Applications to Modeling Engineering Materials," Department of Engineering Technology, University of Pittsburgh at Johnstown PA 15904, Department of Civil Engineering, Morgan State University, 2010.
International Searching Authority, International Search Report and Written Opinion mailed on Mar. 20, 2020, issued in connection with International Patent Application No. PCT/US2019/061349, filed on Nov. 14, 2019, 17 pages.
Liu et al., "Fuzzy Logic Based Symbolic Grounding for Best Grasp Pose for Homecare Robotics," 2012 10th IEEE International Conference on Industrial Informatics, Jul. 25, 2012, pp. 1164-1169.
Papadopoulos et al., "Confidence Estimation for Neural Networks: A Practical Comparison," Department of Electronics and Electrical Engineering, University of Edinburgh, ESANN'2000 proceedings—European Symposium on Artificial Neural Networks Bruges (Belgium), Apr. 26-28, 2000, D-F.

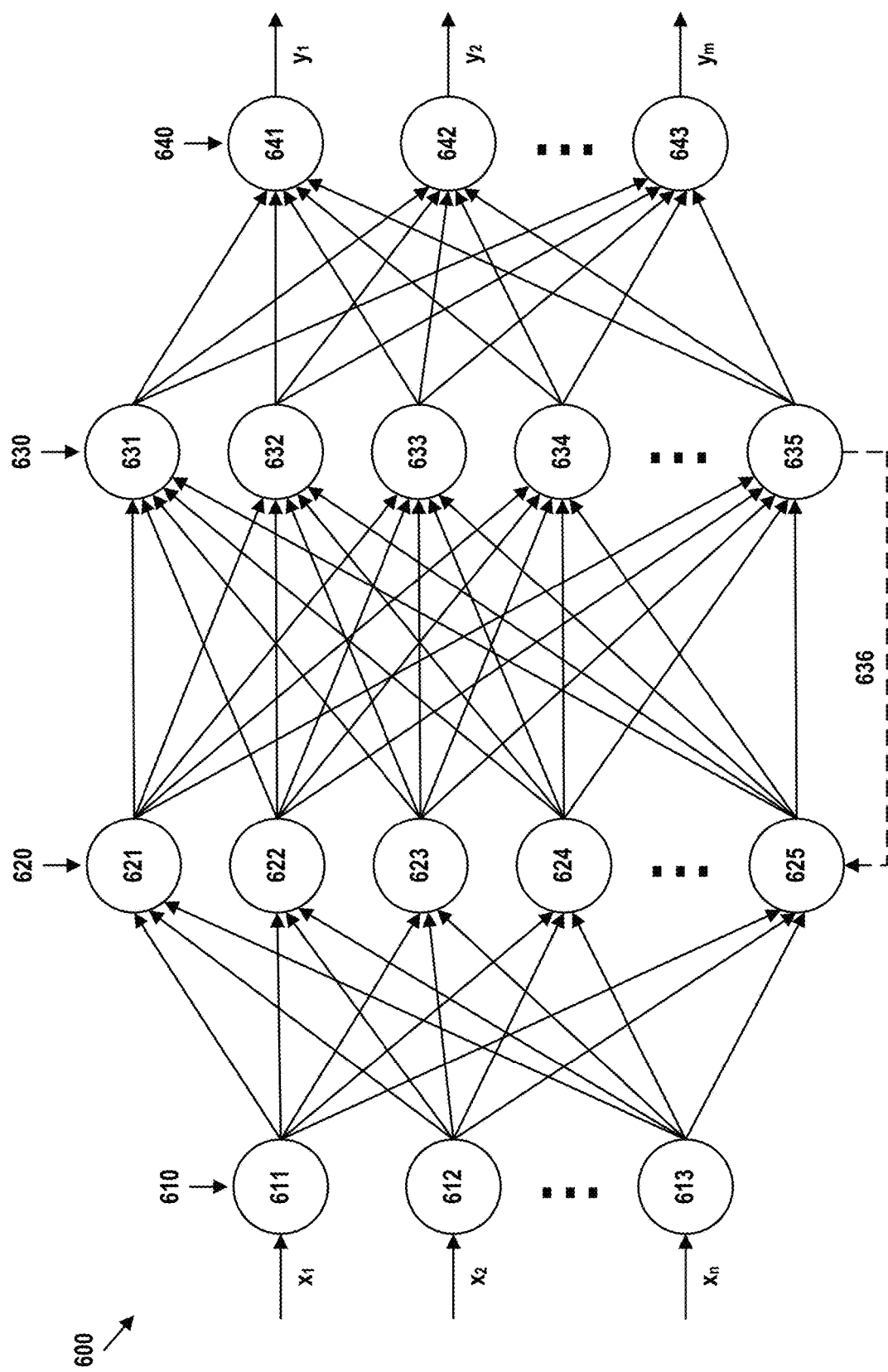

ROBOT BASE POSITION PLANNING

CROSS-REFERENCE TO RELATED APPLICATIONS

This application is a continuation of and claims priority to U.S. patent application Ser. No. 16/204,118, filed Nov. 29, 2018, and titled "Robot Base Position Planning," which is hereby incorporated by reference as if fully set forth in this description.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

In the course of performing operations in a physical environment, a robot may move its manipulator or aspects thereof (e.g., its end effector) to a plurality of different interaction points (e.g., locations from which to pick up or at which to drop-off an object). In order to reach one or more of these interaction points, the robot may determine a position for its base that allows the manipulator to reach the interaction point without the manipulator or other parts of the robot colliding with physical features of the environment. To that end, the robot may utilize a pre-trained model (e.g., a machine learning model such as an artificial neural network) to determine candidate positions within the environment based on a height map representation thereof. These candidate positions are predicted to allow the robot to plan a collisions-free trajectory for parts of the robot, including the manipulator, for reaching the interaction point. One or more of these candidate positions may be selected by the robot to validate that a collision-free trajectory can, in fact, be planned therefrom. Following successful validation, the robot may move to the selected candidate position to operate on the interaction point.

The pre-trained model may be trained using a plurality of sample height maps each associated with one or more validated positions. The validated position in the sample height maps may be calculated off-line (e.g., prior to real-time robotic operation), allowing for determination of a complete set of positions from which a collision-free trajectory can be planned. The pre-trained model may take less time to determine candidate positions for a new height map than it would take to determine the complete set of validated positions for this height map. Nevertheless, the pre-trained model may inherently possess the insights gained from the off-line calculations of validated positions.

In a first embodiment, a robotic device is provided that includes a base, a manipulator connected to the base, a sensor, and a control system. The control system is configured to receive, from the sensor, sensor data representative of surfaces in a physical environment containing an interaction point for the manipulator. The control system is also configured to determine, based on the sensor data, a height map of the surfaces in the physical environment. The control system is additionally configured to determine, by inputting the height map and the interaction point into a pre-trained model, one or more candidate positions for the base of the robotic device to allow the manipulator to reach the interaction point. The control system is further configured to determine a collision-free trajectory to be followed by the manipulator to reach the interaction point when the base of the robotic device is positioned at a selected candidate position of the one or more candidate positions. The control system is yet further configured to, based on determining the collision-free trajectory, provide instructions to cause the base to move to the selected candidate position within the physical environment.

In a second embodiment, a method is provided that includes receiving sensor data representative of surfaces in a physical environment containing an interaction point for a robotic device. The method also includes determining, based on the sensor data, a height map of the surfaces in the physical environment. The method additionally includes determining, by inputting the height map and the interaction point into a pre-trained model, one or more candidate positions for a base of the robotic device to allow a manipulator of the robotic device to reach the interaction point. The method further includes determining a collision-free trajectory to be followed by the manipulator of the robotic device to reach the interaction point when the base of the robotic device is positioned at a selected candidate position of the one or more candidate positions. The method yet further includes, based on determining the collision-free trajectory, causing the base of the robotic device to move to the selected candidate position within the physical environment.

In a third embodiment, a non-transitory computer-readable medium is provided having stored thereon instructions that, when executed by a computing device, cause the computing device to perform operations. The operations include receiving sensor data representative of surfaces in a physical environment containing an interaction point for a robotic device. The operations also include determining, based on the sensor data, a height map of the surfaces in the physical environment. The operations additionally include determining, by inputting the height map and the interaction point into a pre-trained model, one or more candidate positions for a base of the robotic device to allow a manipulator of the robotic device to reach the interaction point. The operations further include determining a collision-free trajectory to be followed by the manipulator of the robotic device to reach the interaction point when the base of the robotic device is positioned at a selected candidate position of the one or more candidate positions. The operations yet further include, based on determining the collision-free trajectory, providing instructions to cause the base of the robotic device to move to the selected candidate position within the physical environment.

In a fourth embodiment, a system is provided that includes means for receiving sensor data representative of surfaces in a physical environment containing an interaction point for a robotic device. The system also includes means for determining, based on the sensor data, a height map of the surfaces in the physical environment. The system additionally includes means for determining, by inputting the height map and the interaction point into a pre-trained model, one or more candidate positions for a base of the robotic device to allow a manipulator of the robotic device to reach the interaction point. The system further includes means for determining a collision-free trajectory to be followed by the manipulator of the robotic device to reach the interaction point when the base of the robotic device is positioned at a selected candidate position of the one or more candidate positions. The system yet further includes means for, based on determining the collision-free trajectory, causing the base of the robotic device to move to the selected candidate position within the physical environment.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 6 illustrates an artificial neural network, in accordance with example embodiments.

DETAILED DESCRIPTION

Figure 1:
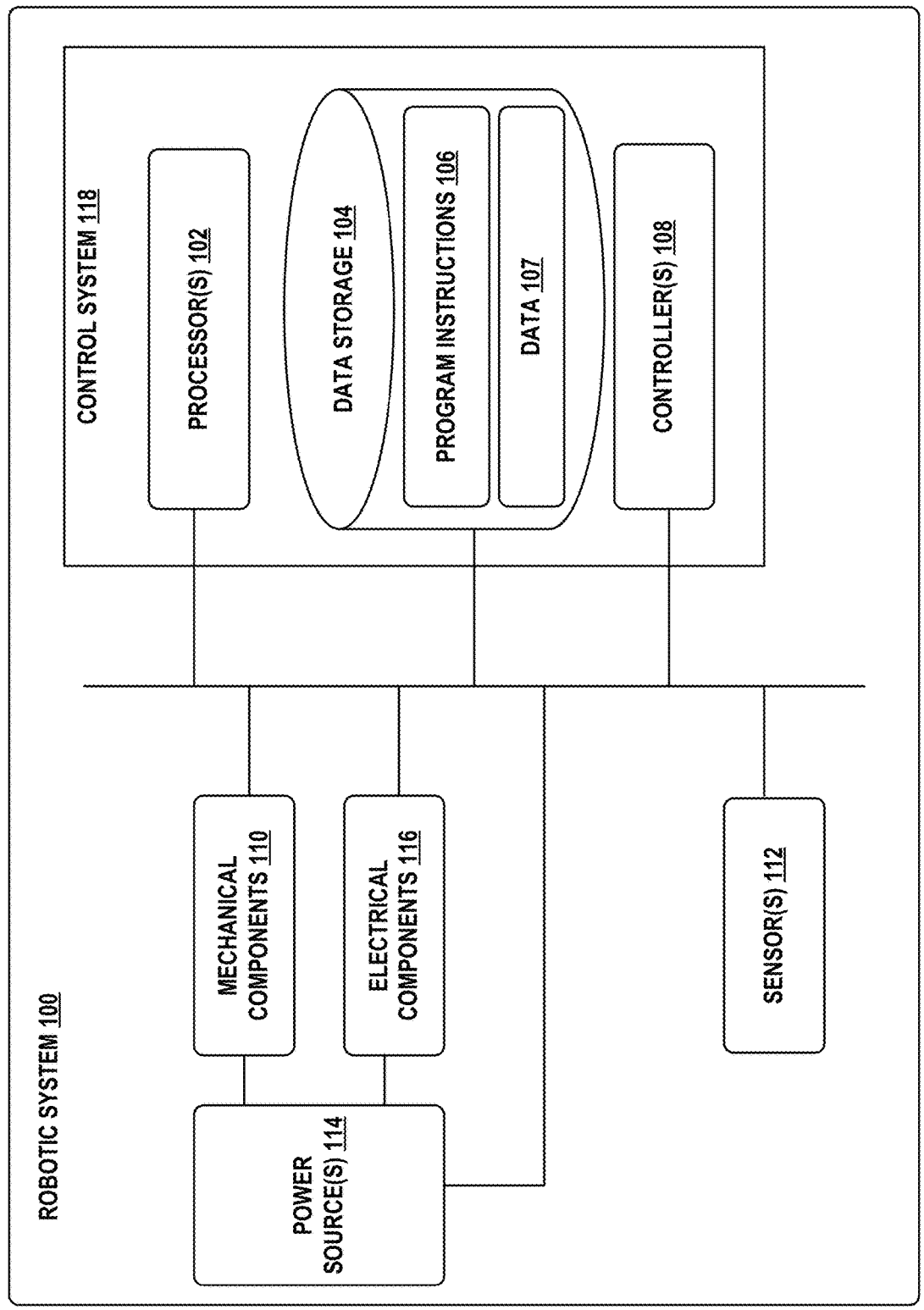
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Robotic devices are used to perform a number of different tasks ranging from assembling automobiles to assisting with various routine household jobs. Many applications, such as automobile assembly or semiconductor manufacturing, involve the robots repeatedly performing the same tasks in a predictable environment. Namely, while performing such tasks, the base of robot may be stationary or allowed to traverse the environment in a predefined manner (e.g., on rails). However, robots are being increasingly used in different, less predictable environments to perform various operations that involve traversing these environments. Many robots are thus mobile and capable of moving through such environments in a manner that is not predefined. For example, the same mobile robot may be used by two different end-users to perform similar tasks in two different environments, each requiring the robot to plan different paths through the respective environment. Additionally, even robots operating in the same general location may be faced with changes in the environment of this location over time, necessitating that the robots adapt to these changes.

Picking up, moving, dropping off, holding, and/or adjusting a position of an object are common operations in many robotic tasks. Interacting with the object in this way by a mobile robot involves moving or repositioning the base of the mobile robot to a position that makes the object accessible to a manipulator (e.g., an arm and an end effector) of the robot. Specifically, the base should be positioned such that (i) an interaction point (e.g., pick-up or drop-off location) within the environment is reachable by the manipulator and (ii) the base, the manipulator, and other parts of the robot do not collide with the environment as the manipulator follows a trajectory to reach the interaction point within the environment. Conventionally, determining the position for the base (i.e., the region to be occupied by the base) involves iteratively selecting and checking different possible positions within the environment until a satisfactory position is found. However, such a guess-and-check approach is computationally expensive and thus time consuming. Namely, the guess-and-check approach may slow down operations of the robot, making the robot unsuitable for certain tasks and/or appear indecisive or hesitant while performing other tasks.

Accordingly, provided herein are techniques for determining, by way of a pre-trained model, candidate positions within an environment from which the robotic device can reach an interaction point without any collisions. Specifically, the model may be trained based on a plurality of sample height maps that represent different physical environments containing therein respective interaction points for the robotic device. In some examples, the height maps may be two-dimensional (2D) height maps. In alternative examples, the height maps may be three-dimensional (3D) voxel grids, among other possibilities. An example physical environment may include, for example, a desk and a cup disposed thereon for pickup by the robot, with the position of the cup representing the interaction point. However, many other physical environments and interaction points are possible. The model may be, for example, an artificial neural network (ANN) or another machine learning model, particularly one that is well-adapted for 2D image to 2D image mapping.

Each of the sample height maps in the training data may be processed by one or more algorithms to identify therein corresponding validated positions that, when occupied by the base of the robot, allow the manipulator of the robot to follow a collision-free trajectory to the interaction point within the environment. Specifically, a collision-free trajectory may define a path for the manipulator and aspects thereof such that no part of the robotic device is determined to collide with or come within a threshold distance of any objects in or feature of the environment (aside from the object being manipulated or interacted with). The validated positions may be represented as one or more regions or areas within the corresponding height map. This processing may take place off-line before the robot uses the model (thus making the model a "pre-trained" model) and thus may be allowed to take more time than similar processing would be allowed to take in real-time robotic operation. Notably, the processing may identify every feasible position within a given height map, thus providing a more complete training set for the pre-trained model.

The model may then be trained using the plurality of height maps and the interaction points within these height maps (representing possible inputs), and the validated positions (representing corresponding correct outputs) determined off-line for each of these height maps. Thus, following training, the trained model may be configured to determine candidate positions within additional height maps that represent surfaces in physical environments that the model has not previously encountered or trained on. Specifically, the pre-trained model may be configured to provide as output a plurality of candidate positions for each new combination of (i) height map and (ii) interaction point provided thereto as input. The output of the pre-trained model may additionally indicate, for each of the plurality of candidate positions, a corresponding confidence level indicating how likely, according to the model, the robot is to plan a collision-free trajectory for that candidate position.

The robot may thus use the pre-trained model to plan the approach path and position of its mobile base when reaching for an interaction point within a new physical environment. Namely, the robot may receive sensor data that represents the new physical environment and the interaction point therein. The robot may determine, based on this sensor data, a corresponding height map representative of surfaces within the new physical environment. When multiple surfaces are present at different heights at a same horizontal position, the height map may represent, for example, surfaces that fall within a particular height range. For example, the height map may represent surfaces that are (i) below a maximum reach height of the manipulator and (ii) above a minimum height that is based on the height of the interaction point (e.g., several inches below a surface from which the robot is to pick up an object).

This height map and the interaction point may then be provided as input to the pre-trained model, which may generate as output candidate positions within the new physical environment. These candidate positions may be predicted to allow the robot, if positioned therein, to reach the interaction point without collisions. The robot may select, for example, a candidate position with the highest corresponding confidence level for evaluation. That is, the robot might not assume that this candidate position will allow a collision-free trajectory to be planned. Instead, the robot may attempt to determine a collision-free trajectory for the manipulator to follow from this candidate position to validate the adequacy of this candidate position.

Notably, the collision-free trajectory may be planned based on a 3D representation of the environment. Thus, when the height map is represented in 2D, the trajectory planning may nevertheless be carried out in three dimensions using a 3D model of the same physical environment.

If a collision-free trajectory can be found for the selected candidate position, the base of the robot may move to this position to pick up the object by following the collision-free trajectory. Alternatively, if a collision-free trajectory cannot be found for the selected candidate position, the robot may select another candidate position to test for whether a collision-free trajectory may be determined therefor. Accordingly, the pre-trained model may reduce the time it takes the robot to find a position from which to pick up the object by predicting the positions most likely to work in view of the different environments used to train the model. Notably, this approach may allow the robot to operate faster, and thus appear more confident, than an approach based on, for example, random selection of candidate positions, a methodical analysis of all possible positions, or another rule-based selection of candidate positions within a new environment.

The pre-trained model may also be used to identify conditions in which a collision-free trajectory is not available. Namely, when the pre-trained model is provided with a height map and an interaction point that are unlike the training data, the pre-trained model might not determine any candidate positions, thereby indicating that the interaction point is unreachable to the manipulator. For example, the pre-trained model might not determine any candidate positions when the interaction point is outside of the range of heights represented by the height map. In such cases, the robotic device may revert to an alternative process for identifying a position from which a collision-free trajectory can be followed (e.g., guess-and-check approach, which may be perceptibly slower), or might forego interaction with the specified interaction point.

In some cases, rather than waiting until a collision-free trajectory is planned before repositioning the mobile base, the robot may advance towards the highest-confidence position. That is, validation of the availability of at least one collision-free trajectory at this highest-confidence position may occur while the robot advances towards it. In another example, the robot may move according to a gradient of the confidence values across the candidate positions. Namely, the robot may move in a direction corresponding to the highest increase in confidence between its current position and any adjacent positions. Thus, this approach allows the pick-up operation to take less time, or at least make the robot appear more confident in its actions.

The pre-trained model may additionally be trained on, configured to take as input, and generate its output based on additional information that defines the operation to be carried out at the interaction point (e.g., object pick-up, object drop-off, object holding) or environmental conditions. In one example, the pre-trained model may be configured to determine candidate positions based on the pose (i.e., position and orientation) of an object to be picked up from the interaction point. In another example, the pre-trained model may be configured to determine candidate positions based on a path of a tool or end effector of the manipulator involved in picking up the object. For example, given a cup to be picked up by a handle thereof using a gripper, the gripper may need to approach the cup from a particular direction and in a particular orientation in order to grasp the handle. In a further example, the pre-trained model may be configured to determine candidate positions based on a physical structure of the robot involved in picking up the object.

When the pre-trained model is an ANN, the structure thereof may include an input layer, an output layer, and one or more hidden layers. The hidden layers may include one or more general layers that are object-independent, task-independent, and/or robot-independent. That is, these general layers may determine candidate positions without accounting for attributes of the object (e.g., shape, size, orientation), attributes of the task (e.g., pick-up vs drop-off), and/or attributes of the robot (e.g., size, degrees of freedom, gripper type, etc.).

The hidden layers may also include one or more additional layers that are specific to a particular object, task, and/or robot. These additional layers may thus operate to filter the results generated by the general layers, selecting candidate positions predicted to work best for a particular object, task, or robot. By structuring the ANN in this way, the ANN may be quickly adapted to new objects, tasks, and/or robots without needing to be entirely retrained using a large amount of new training data. Instead, a new object-specific, task-specific, and/or-robot-specific layer may be trained and added upstream of the general layers. Notably, such training may use fewer training samples than would be necessary to retrain the entire network.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Furthermore, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic device 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, control system 118 may perform operations to cause the robotic device 100 to move according to the requested gait. As another illustration, a control system may receive an input indicating an instruction to move to a particular geographical location. In response, control system 118 (perhaps with the assistance of other components or systems) may determine a direction, speed, or gait based on the environment through which robotic system 100 is moving en route to the geographical location.

Operations of control system 118 may be carried out by processor(s) 102. Alternatively, these operations may be carried out by controller 108, or a combination of processor(s) 102 and controller 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include physical members such as leg(s), arm(s), wheel(s), track(s), hand(s), digit(s), feet, or end effectors. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable digits, arms, hands, feet, or legs, so that these appendages can be replaced or changed as needed or desired. In some implementations, robotic system 100 may include one or more removable or replaceable battery units or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In an example configuration, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of extendable legs, arms, or other mechanical or electrical features of robotic system 100. The data provided by sensor(s) 112 may enable control system 118 to determine errors in operation as well as monitor overall operation of components of robotic system 100.

As an example, robotic system 100 may use force sensors to measure load on various components of robotic system 100. In some implementations, robotic system 100 may include one or more force sensors on an arm, leg, hand, foot, or digit to measure the load on the actuators that move one or more members of the arm, leg, hand, foot, or digit. As another example, robotic system 100 may use one or more position sensors to sense the position of the actuators of the robotic system. For instance, such position sensors may sense states of extension, retraction, positioning, or rotation of the actuators on arms, legs, hands, feet, digits, or end effectors.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Although not shown in FIG. 1, robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic device 100, such as on the body or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, robotic system 100 may include various types of legs, arms, wheels, tracks, end effectors, gripping devices and so on. In general, robotic system 100 may be configured with zero or more legs. An implementation of the robotic system with zero legs may include wheels, treads, tracks, or some other form of locomotion. An implementation of the robotic system with two legs may be referred to as a biped, and an implementation with four legs may be referred as a quadruped. Implementations with six or eight legs are also possible. For purposes of illustration, robotic arm implementations of robotic system 100 are described below.

Figure 2:
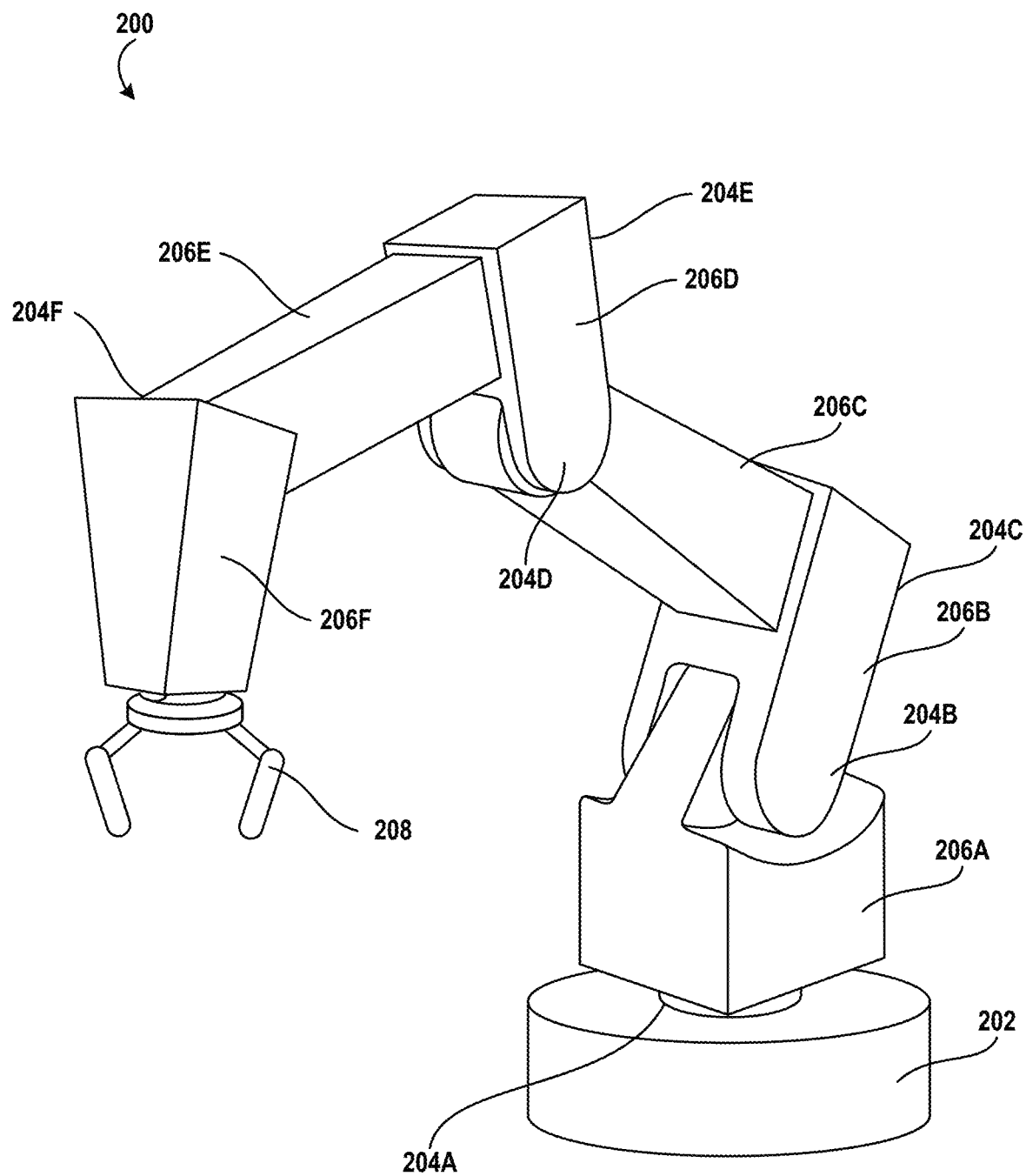
FIG. 2 illustrates a robotic arm, in accordance with example embodiments.

FIG. 2 shows an example robotic arm 200. As shown, robotic arm 200 includes a base 202, which may be a stationary base or may be a movable base. In the case of a movable base, the base 202 may be considered as one of mechanical components 110 and may include wheels (not shown), powered by one or more of actuators, which allow for mobility of the entire robotic arm 200.

Additionally, robotic arm 200 includes joints 204A-204F each coupled to one or more actuators. The actuators in joints 204A-204F may operate to cause movement of various mechanical components 110 such as appendages 206A-206F or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a digit gripper as shown here or a different type of gripper such as a suction gripper. In another example, end effector 208 may take the form of a tool such as a drill or a brush. In yet another example, the end effector may include sensors such as force sensors, location sensors, or proximity sensors. Other examples may also be possible.

III. Example Candidate Position Determination

Figure 3:
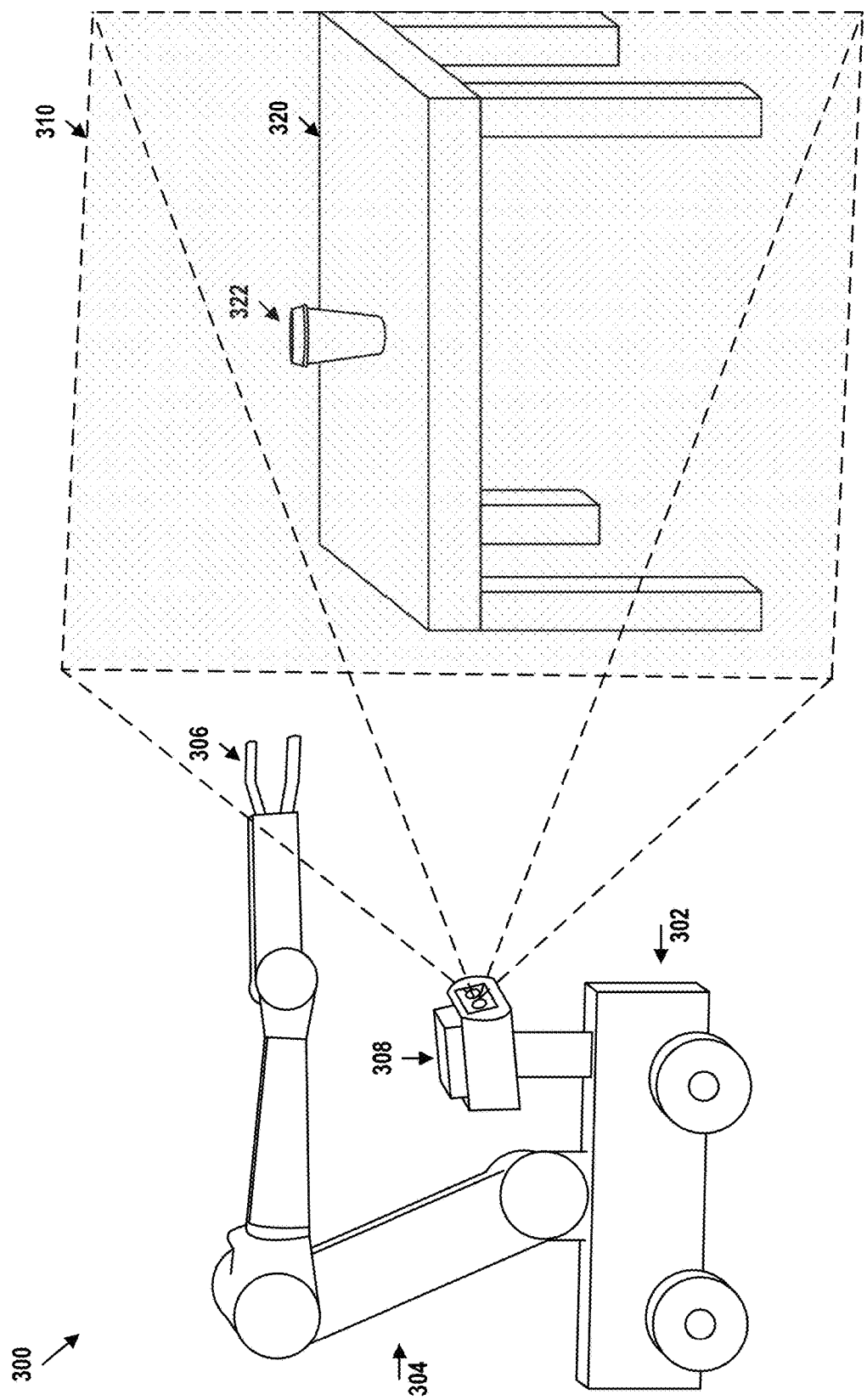
FIG. 3 illustrates a robotic device scanning an environment, in accordance with example embodiments.

FIG. 3 illustrates an example robotic device 300 that may be involved in the performance of the operations herein described. Robotic device 300 may be an example implementation of robotic system 100 or a variation of robotic arm 200. Thus, some of the operations described herein as being performed by robotic device 300 may be carried out by, for example, control system 118 thereof.

Robotic device 300, or robot for short, includes base 302 which includes wheels that allow base 302 to reposition robot 300 within an environment. Robot 300 also includes manipulator 304 (e.g., an arm) connected at a first end thereof to base 302. End effector 306 (e.g., a gripper) is connected to a second end of manipulator 304. Manipulator 304 may be configured to move with a plurality of degrees of freedom (e.g., 6 degrees of freedom) to interact with various objects. Robot 300 may also include head 308 that houses therein one or more sensors used to measure (e.g., perceive or observe) various aspects of the environment. However, sensors may also be disposed in other parts of robot 300 such as, for example, an area between the fingers (i.e., the palm) of a gripper that makes up end effector 306.

Robot 300 may be configured to perform various tasks in a plurality of different physical environments. Each environment may include therein a plurality of different surfaces defined by physical items such as floors, walls, desks, chairs, and shelves, among others, that collectively make up the topography of the environment. FIG. 3, for example, illustrates table 320 that has a tabletop surface on which cup 322 is disposed.

Performance of the various tasks in the environments may involve interacting with, operating on, or operating nearby specific locations within the environments. These specific locations may be referred to as interaction points. That is, an interaction point may be a location within the environment that manipulator 304 or end effector 306 thereof is to reach in order to perform one or more operations within the environment. The tasks may involve placing an object at an interaction point, picking-up an object from an interaction point, and/or holding an object nearby or at the interaction point, among other possibilities. For example, robot 300 may be configured to pick-up cup 322 from the specific location (i.e., the interaction point) on the tabletop surface of table 320 and move cup 322 to another location (e.g., garbage can or dishwasher).

To that end, robot 300 may be configured to scan the environment using one or more of its sensors (e.g., in head 308), as illustrated by field of view 310. The sensors may generate, among other possibilities, perception data in the form of one or more of image data, depth data, or a combination thereof. Based on sensor data generated during this scan, robot 300 may be configured to determine a height map of the environment. The height map may indicate a plurality of heights of surfaces within the environment. For example, the height map may indicate the height of the tabletop of table 320, cup 322, and the floor around table 320.

The height map may be represented in multiple different ways. In one example, the height map may be a two-dimensional (2D) height map that represents a top-down view of the environment. The 2D height map may be represented as a grid, with each element, or cell, of the grid corresponding to an area within the environment. Each respective cell may be associated with a value that indicates the height of a surface in the corresponding area within the environment. The different heights represented by the 2D height map may be visually indicated with a grayscale or color image, where each shade of grey or color, respectively, represents a particular discrete height value. Notably, FIG. 5B illustrates a height map of an example environment shown in FIG. 5A.

In another example, the height map may be a three-dimensional height map. For example, the 3D height map may be a voxel grid, where each voxel indicates whether a volume of the environment represented thereby is occupied or unoccupied. Thus, the 3D height map may be able to indicate multiple different heights at each horizontal position within the environment. For example, the 3D height map may indicate that the tabletop of table 320 is at a first height and the floor is at a second height below the tabletop. Other implementations of the height map are possible. Notably, in some implementations, even when the height map is 2D, a 3D representation of the environment may nevertheless be determined for use in planning of the trajectory of manipulator 304.

Once the height map is determined, robot 300 may identify or designate therein the interaction point associated with one or more operations. For example, robot 300 may identify the position of cup 322 as an interaction point associated with picking up cup 322. In order to reach cup 322, robot 300 may need to satisfy at least two conditions. First, robot 300 may need to identify a position that base 302 can occupy within a threshold distance of the interaction point so that the interaction point is within reach of manipulator 304. Notably, base 302 needs to be able to move to this position from its current location. Second, robot 300 may need to determine a collision-free trajectory for moving end effector 306 (or another part of manipulator 304) to the interaction point while base 302 is so positioned. The trajectory of manipulator 304 may define a path in space for end effector 306 and one or more portions of manipulator 304. In some implementations, the trajectory may additionally define the velocity and acceleration at one or more points along the path. The trajectory may be determined under the constraint that it is achievable (i.e., physically reachable) by manipulator 304, among other parts of robot 300.

Conventionally, a position for base 302 may be identified by iteratively selecting a test position within the physical environment to evaluate for whether the interaction point will be reachable without any collisions if base 302 is disposed at this tests position. That is, a test position may be guessed and then checked for suitability in planning a collision-free trajectory. Specifically, robot 300 may attempt to plan one or more trajectories for reaching the interaction point while assuming that base 302 will be disposed at the test position while the trajectories are executed. If at least one of the one or more trajectories is collision-free, the test position may be selected for occupancy by base 302. If not, another test position may be selected for evaluation. When a test position is found that allows for the interaction point to be reached without any collisions when base 302 is disposed at this tests position, robot 300 may be moved to this position and manipulator 304 may be actuated to follow the collision-free trajectory to reach the interaction point.

The test position may be selected using heuristics or other rule-based algorithms. For example, any position within the threshold distance of the interaction point that is unoccupied may be selectable as a test position. Positions that form part of large unoccupied regions may be selected for testing before positions that form part of smaller unoccupied regions. In another example, test positions may be selected randomly. In a further example, test positions may be selected in a predetermined fashion (e.g., starting from the bottom left corner of the height map and moving right and upwards). Other approaches are possible.

Notably, due to the variety of possible physical environments in which robot 300 may operate, a rule-based algorithm might not be able to quickly and accurately identify feasible positions in such a range of environments. Random or methodical selection of test positions may face a similar problem. Thus, before a satisfactory position is found, multiple different unsatisfactory positions may be evaluated. Evaluating multiple positions in this manner is a computationally-intensive and time-consuming process, especially where a large number of test positions needs to be evaluated before finding a satisfactory position. As a result, the robot may take a long time to find a satisfactory position (e.g., more than ten seconds) and perform a given task. Additionally, a robot operating in this manner may slow down or stop moving until a satisfactory test position is identified. As a result, the robot may appear hesitant or lacking in confidence, which may result in any humans operating in a shared environment with this robot lacking confidence in the robot's abilities and being uncomfortable working with the robot.

Figure 4:
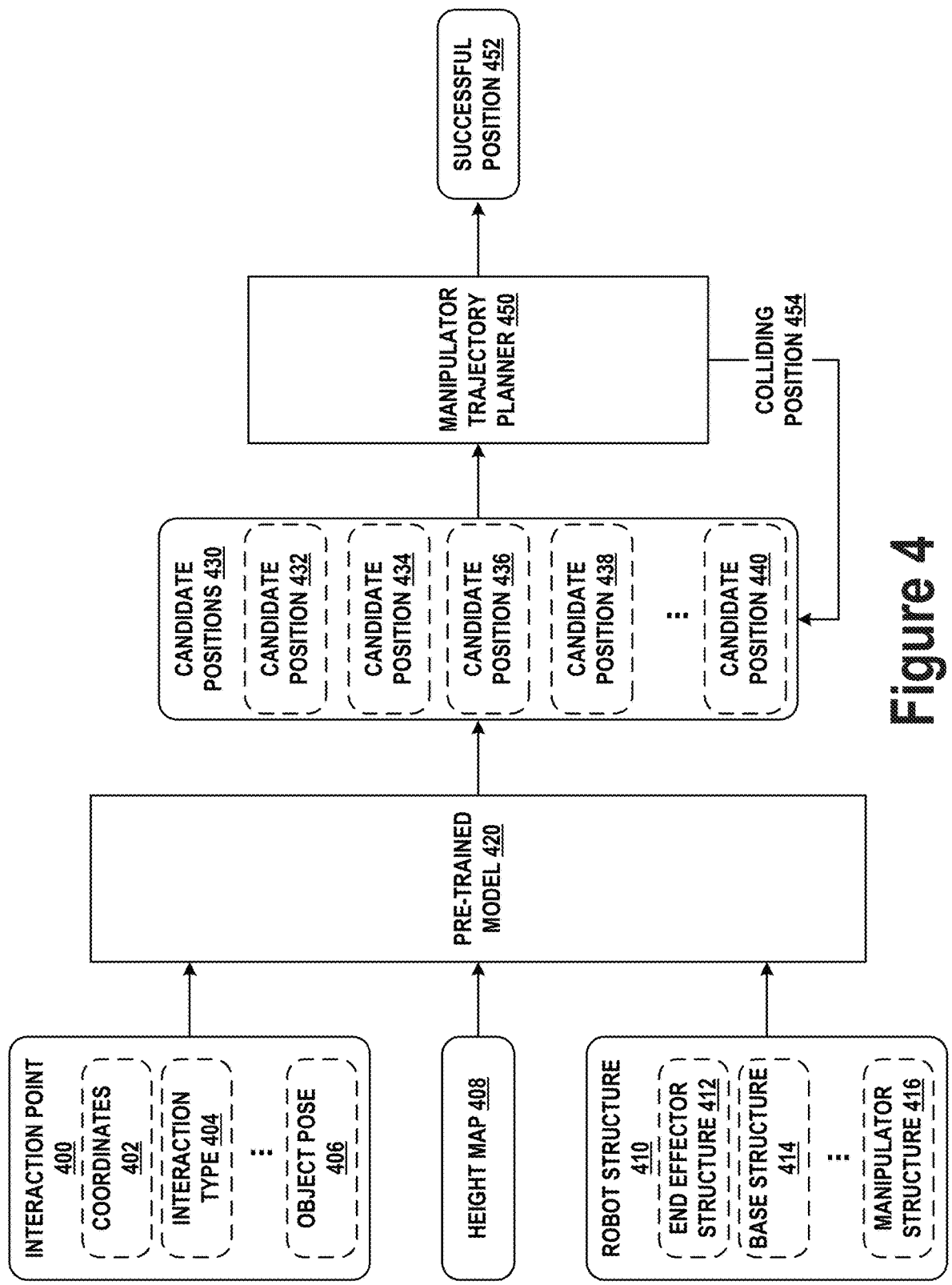
FIG. 4 illustrates a system for determining positions for a base of a robotic device, in accordance with example embodiments.

Accordingly, FIG. 4 illustrates a system for more accurately and quickly determining candidate positions for base 302 of robot 300 that allow manipulator 304 to reach an interaction point within an environment. The system of FIG. 4 utilizes pre-trained model 420 to determine candidate positions within the physical environment that are most likely to allow robot 300 to plan a collision-free trajectory for reaching an interaction point within the environment. Thus, rather than evaluating multiple test positions whose likelihood of success might not be known, the system of FIG. 4 allows robot 300 to start the evaluation with candidate positions that are most likely to yield satisfactory results.

The system of FIG. 4 includes pre-trained model 420 and manipulator trajectory planner 450. Pre-trained model 420 may be an artificial intelligence (AI) algorithm, a machine learning (ML) algorithm, or another algorithm capable of learning based on prior examples or other feedback. An example implementation of pre-trained model 420 is illustrated in and described with respect to FIG. 6. An example training procedure for configuring model 420 to determine candidate positions is illustrated in and described with respect to FIG. 7. Pre-trained model 420 is configured to identify candidate positions 430 (i.e., candidate position 432, 434, 436, 438, and 440) based at least on interaction point 400 and height map 408. In some implementations, pre-trained model 420 may additionally be configured to base the determination of candidate positions 430 on robot structure 410 of the robotic device for which planning is to be carried out.

Interaction point 400 may define one or more of coordinates 402, interaction type 404, and object pose 406. Coordinates 402 may define, for example, the x-position, y-position, and z-position of interaction point 400. Interaction type 404 may indicate that an object is to be picked-up from coordinates 402, an object is to be dropped-off at coordinates 402, or an object is to be held at coordinates 402 (e.g., a paint nozzle is to be positioned at the interaction point to paint a nearby object), among other possibilities. Object pose 406 may define an orientation in which the object is currently disposed at interaction point 400, or an orientation in which the object is expected to be disposed or held at interaction point 400. Interaction point 400 may thus dictate where, how, and how long manipulator 304 or end effector 306 should be positioned to complete the operation associated with interaction point 400.

Height map 408 may be a 2D or 3D representation of surfaces within the physical environment that contains interaction point 400 for robot 300. Accordingly, coordinates 402 may define a position within or with respect to height map 408. As discussed above, height map 408 may be determined by robot 300 based on sensor data from sensors on robot 300. Notably, height map 408 may represent an environment that has not been used to train pre-trained model 420.

Robot structure 410 may include one or more of end effector structure 412, base structure 414, and manipulator structure 416. End effector structure 412 may indicate a type, size, and arrangement of aspects of end effector 306, among other attributes. For example, end effector type 412 may indicate that end effector 306 is an actuated gripper, an underactuated gripper, or a suction gripper, among other possibilities. Base structure 414 may indicate a size of base 302 and a type of mechanism used for locomotion thereof (e.g., wheels, tracks, etc.), among other attributes. Manipulator structure 416 may indicate the number of degrees of freedom of manipulator 304, a length of manipulator 304 of the different linkages thereof, or a reach of manipulator 304, among other attributes thereof.

In some implementations, pre-trained model 420 may be specific to a first robot and thus robot structure 410 might not need to be provided to pre-trained model 420. That is, pre-trained model may be trained to determine candidate positions 430 on the assumption that the first robot, having a specific physical structure, will be operating on the interaction point. In this case, some variation in the structure of a second robot from that of the first robot might not adversely impact the ability of pre-trained model 420 to accurately identify candidate positions 430 for the second robot. However, as the structure of the second robot deviates more significantly from that of the first robot (e.g., beyond a threshold difference as measured, for example, by the reach of the respective manipulators), candidate positions 430 might become less accurate for the second robot. For example, the second robot, having a shorter reach and fewer degrees of freedom than the first robot, might not be able to access the interaction point from some candidate positions that would otherwise work for the first robot due to its longer reach and additional degrees of freedom.

Accordingly, as an alternative, pre-trained model 420 may be configured to determine candidate positions 430 for a plurality of different robots having a plurality of different structures. Thus, pre-trained model 420 may utilize robot structure 410 in making this determination. For example, a first stage or module of pre-trained model may determine a plurality of candidate positions that would be suitable for a plurality of different robotic structures. A second stage or module may then select, from the plurality of candidate positions, a subset expected to be specifically suitable for a robot having structure 410. In such an implementation, adapting pre-trained model 420 to a new robot may involve re-training the second stage or module, rather than re-training the entirety of pre-trained model 420.

In some implementations, each of candidate positions 430 may be associated with a corresponding confidence value indicating how likely a given candidate position is to allow a collision-free trajectory to be planned for manipulator 304. Additionally or alternatively to explicitly providing a confidence value, pre-trained model may sort candidate positions 430 from most likely to least likely to allow a collision-free trajectory to be planned.

Manipulator trajectory planner 450 may be configured to receive one or more of candidate positions 430 as input and attempt to plan a collision-free trajectory for manipulator 304 given that base 302 will be disposed at the one or more of candidate positions 430. When pre-trained model 420 indicates the confidence value associated with each of candidate positions 430, or sorts positions 430, trajectory planner 450 may be configured to start planning with the candidate position most likely to succeed. For example, given that candidate positions 432-440 are arranged in order of decreasing confidence values, trajectory planner would first select candidate position 432 for testing. Trajectory planner would then plan and simulate one or more candidate trajectories for manipulator 304 moving relative to base 302 positioned at candidate position 432. Trajectory planner 450 may be configured to check whether any portion of robot 300 intersects with or comes within a threshold distance of (i.e., collides with) any features within the physical environment (e.g., as represented by the sensor data or a model generated based thereon) at a plurality of different points along the one or more candidate trajectories.

If any of the one or more candidate trajectories are determined to be collision-free, candidate position 432 may be selected as a successful position 452 to be executed in the physical environment. On the other hand, if none of the one or more candidate trajectories are found to be collision-free, candidate position 432 may be determined to be a colliding position 454. Trajectory planner 450 may be configured to then select for evaluation candidate position 434 which has the next highest confidence value.

Thus, although a given candidate position might not allow for a collision-free trajectory to be planned, the number of candidate trajectories needed to be tested before a satisfactory one is found may be reduced relative to conventional position planning operations. Notably, the system of FIG. 4 may be able to evaluate approximately 10-20 candidate positions in under 1 second, and at least one of these 10-20 candidate positions may be likely to yield a collision-free trajectory. Thus, the system of FIG. 4 may be able to identify a collision-free trajectory in less than one tenth of the time taken by conventional position planning operations, which may take upwards of 10 seconds to identify a collision-free trajectory.

Once successful position 452 is determined by pre-trained model 420 and verified by trajectory planner 450, robot 300 may be caused to move to successful position 452 and execute one of the planned collision-free trajectories. In one example, robot 300 may be caused to move to successful position 452 after determining that a collision-free trajectory is available therefor. That is, assuming candidate position 434 (but not 432) is determined to be successful position 452, movement of robot 300 might not be directed at candidate position 434 until candidate position 434 is verified by trajectory planner 450. Alternatively, robot 300 may be caused to first move towards candidate position 432 before or while candidate position 432 is evaluated by trajectory planner 450. When candidate position 432 is found to be unsuitable, robot 300 may be redirected towards candidate position 434. That is, robot 300 may be cause to move towards the candidate position with the highest confidence value until this candidate position is found to be a colliding position.

In an alternative implementation, robot 300 may be caused to move according to a gradient of confidence values across candidate positions 430. The gradient may be computed for a given candidate position by determining the difference in confidence values between the given candidate position and neighboring candidate positions (e.g., candidate positions above, below, left, and right of the given candidate position). The neighboring candidate positions may be directly adjacent to one another or may be separated from one another by one or more positions within the physical environment that are not selected as candidate positions. Robot 300 may be caused to move from its current position in a direction associated with a highest value of the gradient (i.e., a highest increase in confidence associated among candidate positions 430).

The gradient may be periodically recomputed as (i) additional sensor data is received that results in an update to height map 408, candidate positions 430, and the respective confidence values associated with candidate positions 430, and (ii) one or more of candidate positions 430 are found to be colliding by trajectory planner 450. By causing robot 300 to move according to the gradient, robot 300 may be directed towards candidate positions that have an increasingly higher probability of yielding collision-free trajectories.

By advancing robot 300 either according to the gradient or towards a candidate position with the highest confidence value, robot 300 may appear to be more capable and confident than a robot that stands in place while searching for a suitable position for base 302. Additionally, by relying on pre-trained model 420, robot 300 might change how it approaches the interaction point only a few times (e.g., once after determining that candidate position 432 is unsuitable) and, notably, this chance in direction might be small enough so as to be imperceptible or appear to be part of normal operation of the robot, contrary to a long pause while robot 300 looks for a position using conventional methods.

Figure 5A:
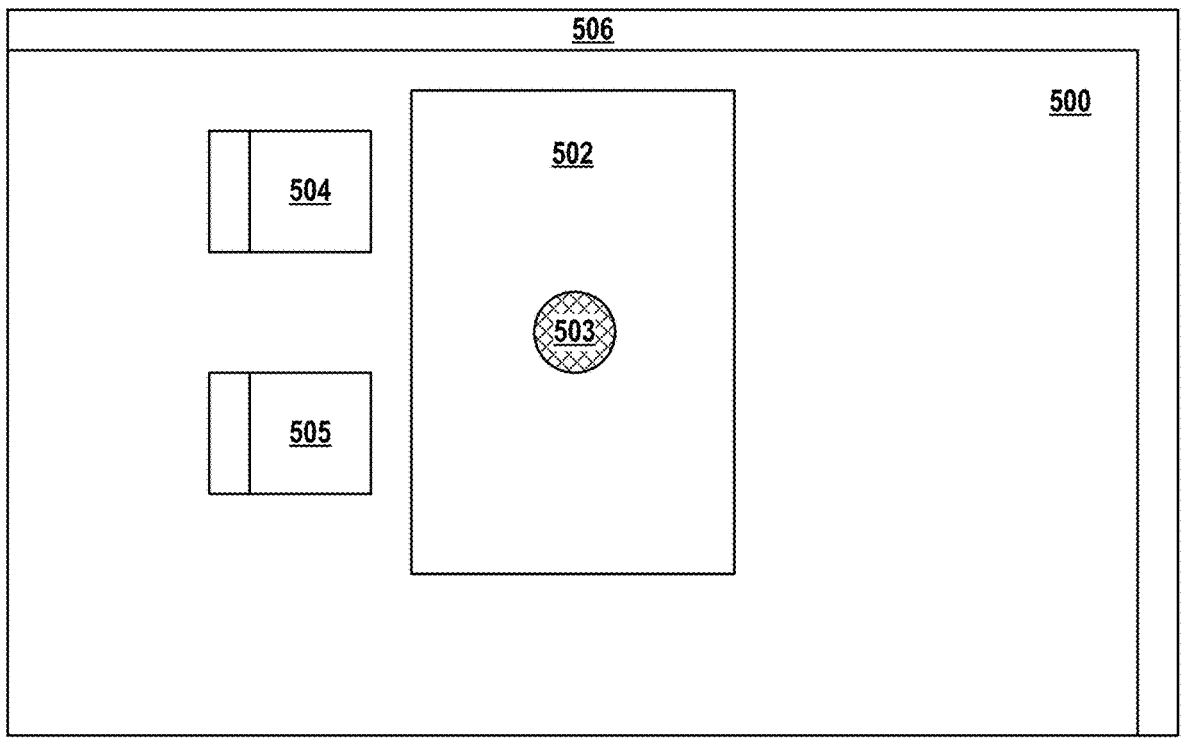
FIG. 5A illustrates surfaces within an environment, in accordance with example embodiments.
Figure 5B:
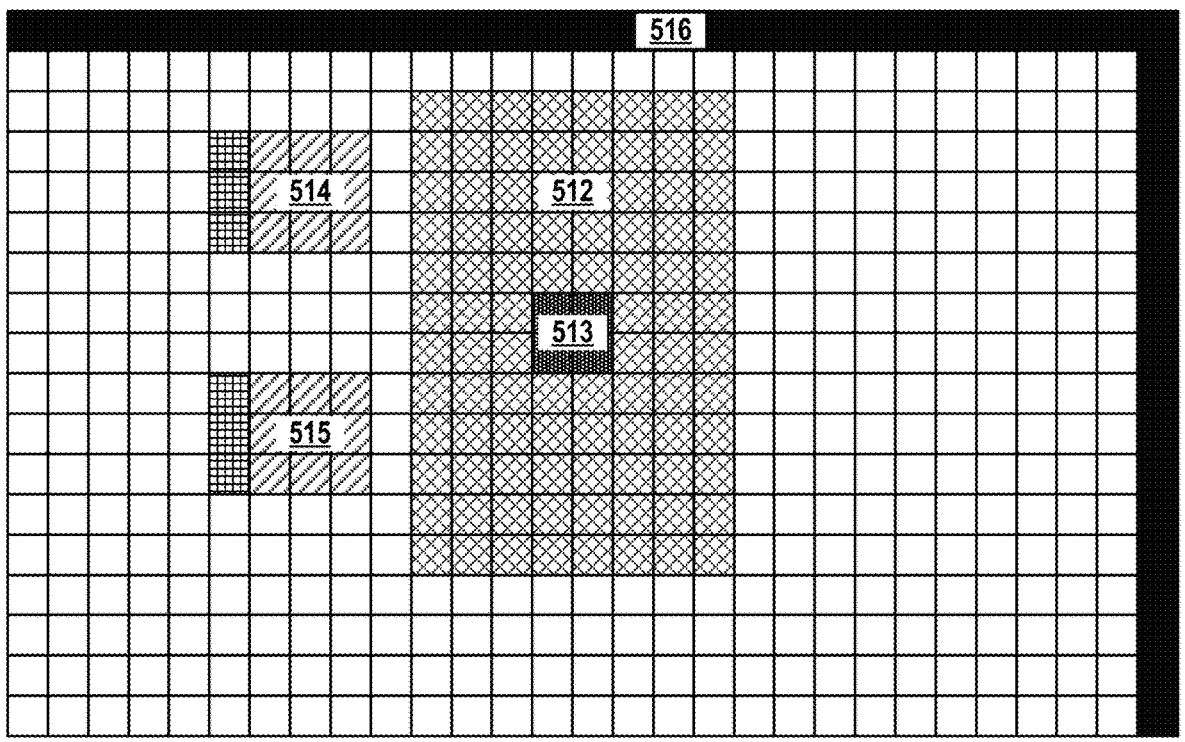
FIG. 5B illustrates a height map of the surfaces within the environment, in accordance with example embodiments.

FIG. 5A illustrates a top-down view of an example physical environment in which robot 300 may be configured to operate. Physical environment 500 includes wall 506 that defines a boundary of physical environment 500. Environment 500 also includes therein table 502 having disposed thereon cup 503 with which robot 300 is to interact (e.g., pick up the cup), and chairs 504 and 505 disposed to the left of table 502. As described with respect to FIG. 3, robot 300 may use one or more sensors to scan environment 500. Based on the sensor data received from the sensors during this scan, robot 300 may determine a height map of environment 500, as illustrated in FIG. 5B.

FIG. 5B illustrates environment 500 as a 2D height map that subdivides environment 500 according to a grid. The different surfaces present in environment 500 are illustrated using different patterns at the corresponding elements (i.e., squares, pixels, or cells) of the grid. Each pattern additionally indicates a height of the corresponding surface. Namely, table 502, the tabletop of which is positioned at a first height, is illustrated using first pattern 512 (i.e., cross-hatching) at the corresponding grid elements. Similarly, the seats of chairs 504 and 505, which are positioned at a second height, are illustrated using two instances 514 and 515 of a second pattern (i.e., one-directional hatching). The backs of chairs 504 and 505, which are positioned at a third height, are illustrated using two instances of a third pattern (i.e., a fine grid). Wall 506, which extends from the floor to the ceiling, is illustrated using a fourth pattern 516 (i.e., solid black color). Cup 503, which is positioned at a fifth height, is illustrated using a fifth pattern 513 (i.e., black dotted with white). Finally, the floor of environment 500, which is positioned at a sixth height, is illustrated using a sixth pattern (i.e., solid white color).

In some cases, environment 500 may include, at a particular horizontal position, two or more different objects at two or more different heights. For example, the horizontal region occupied by table 502 may include the floor at the sixth height and the tabletop of table 502 at the first height. Alternatively or additionally, a chandelier may be suspended above table 502 at a seventh height. In such instances, the height map may be generated by filtering out one or more of the physical features when generating the height map. For example, objects below a first height threshold (other than the floor) and above a second height threshold might not be included in the height map. The second height threshold may be defined, for example, based on a reach of manipulator 304. Thai is, surfaces that manipulator 304 cannot reach need not be represented in the height map as no collisions therewith are possible. The first height threshold may be defined based on the height of the interaction point. That is, the first height threshold may be a particular distance below the height of the interaction point.

When two objects fall within the first and second height thresholds, the height map may represent, for example, the one having the greater height (e.g., pattern 513, representing cup 503, is shown in the middle of pattern 512 representing table 502). Alternatively, in some cases, a modified height map may be used to store multiple height values for each horizontal grid position (e.g., akin to a red-green-blue image, rather than a grayscale image), thereby allowing multiple heights to be accounted for by the height map at each grid position. Notably, such a modified height map may be used to represent objects whose height falls outside of the of the first or second threshold.

Figure 5C:
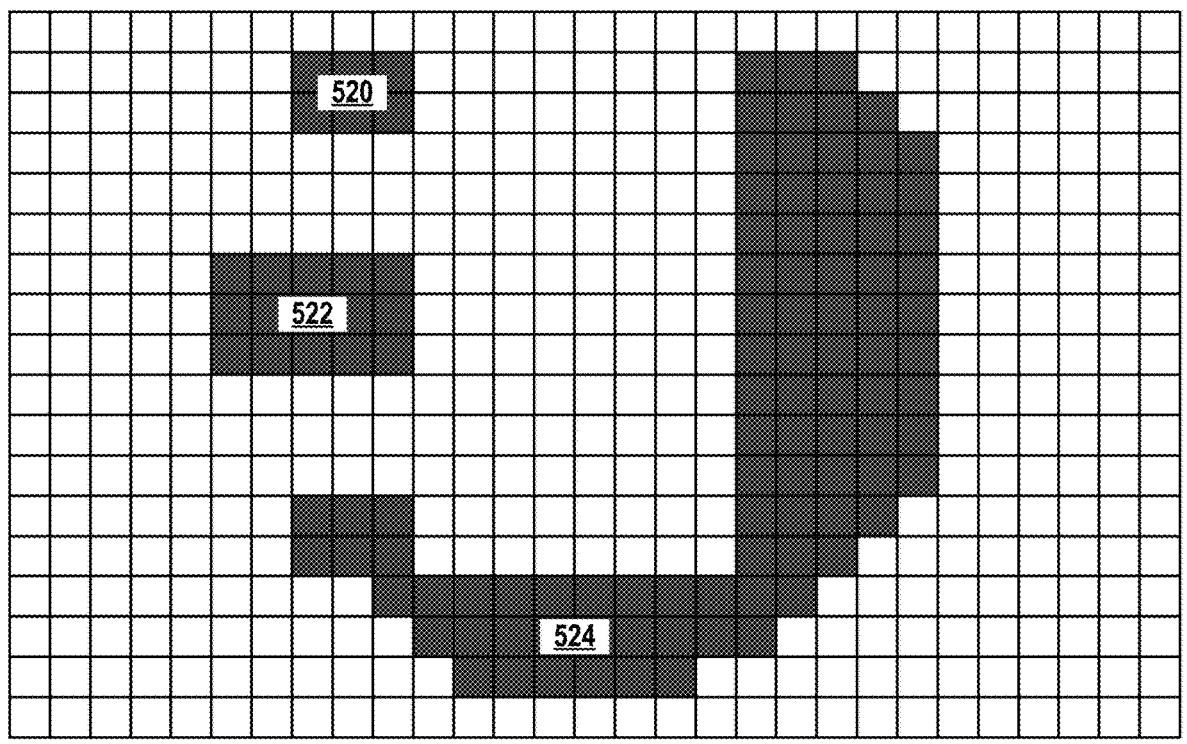
FIG. 5C illustrates candidate positions within the environment, in accordance with example embodiments.
Figure 5D:
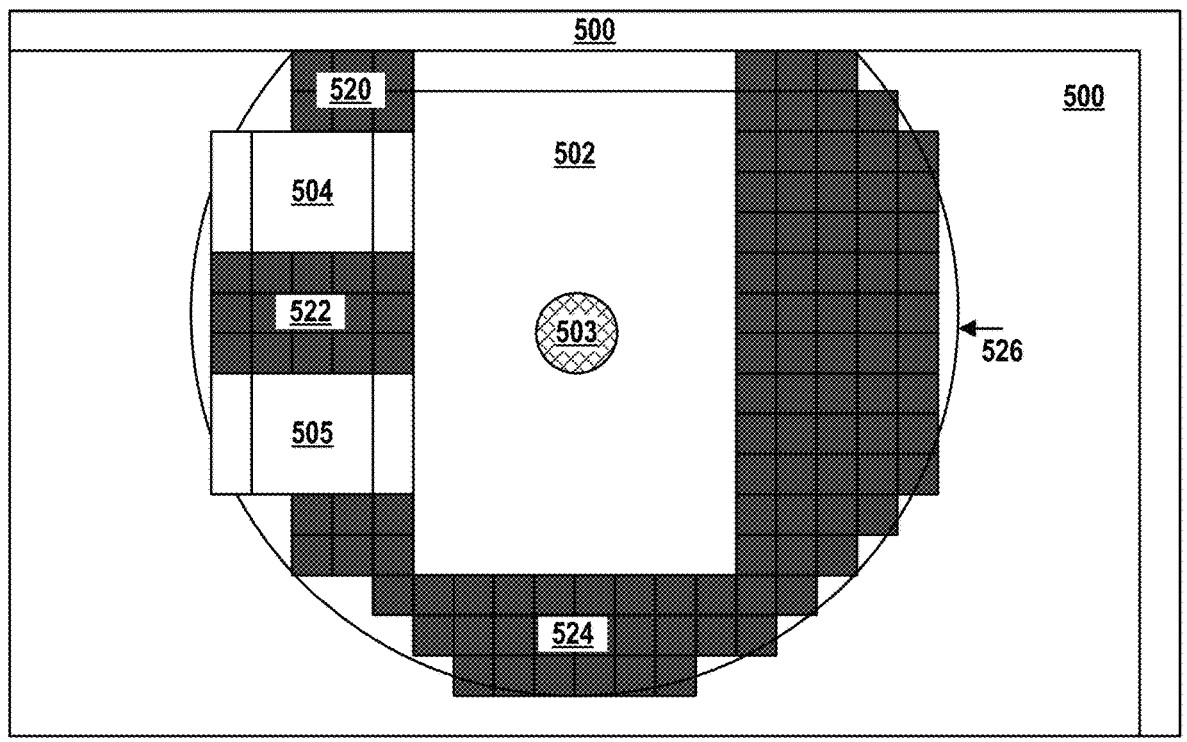
FIG. 5D is another illustration of the candidate positions of FIG. 5C, in accordance with example embodiments.

The height map of environment 500 may be provided to pre-trained model 420 in order to determine therein one or more candidate positions for base 302. FIG. 5C illustrates an example output of pre-trained model 420. The output includes three different regions 520, 522, and 524 that collectively define the plurality of candidate positions for base 302 or a portion thereof. FIG. 5D illustrates regions 520, 522, and 524 superimposed on the image of environment 500 to show how the output of pre-trained model 420 corresponds with physical environment 500. Notably, regions 520, 522, and 524 are regions around table 502 that are not occupied by chairs 504 and 505. Additionally, occupancy of regions 520, 522, and 524 by base 302 places cup 503 within reach of manipulator 304. Circle 526 approximately outlines the area from within which cup 503 may be within reach of manipulator 304 (although it does not indicate that all regions of this area are occupiable by base 302 or that a collision-free trajectory could be planned thereat).

A candidate position may include one or more of the grid elements of regions 520, 522, and 524. In one implementation, each grid element of the height map may be sized to be smaller than the width or length of base 302. For example, each grid element may be between 1 and 2 centimeters while mobile base 302 has a length of approximately 45 centimeters (e.g., +/−5 centimeters). A candidate position may be defined by one of the grid elements under the assumption that a particular portion of mobile base 302 will occupy the corresponding physical location. The particular position may be, for example, a center of mobile base 302, a center of a front axle thereof, or a center of a rear axle thereof, among other possibilities.

Each grid element may therefore be associated with a corresponding confidence value. Notably, the confidence value may be conditioned upon the particular portion (e.g., center) of mobile base 302 occupying the corresponding physical position. That is, if mobile base 302 is positioned such that the particular portion (e.g., center) thereof occupies the candidate position (i.e., the grid element), the confidence value of that grid element may be an accurate representation of the actual likelihood of determining a collision-free trajectory therefrom. On the other hand, if mobile base 302 is positioned such that a different portion (e.g., front axle) thereof occupies the candidate position, the confidence value of that grid element might not be an accurate representation of the actual likelihood of determining a collision-free trajectory therefrom.

In another implementation, a candidate position may be defined by a plurality of grid elements that approximate or outline the shape of base 302. For example, rectangular region 520 may approximate or outline the length and width of base 302. Thus, region 520 may be considered a candidate position. On the other hand, region 522 may include therein multiple different candidate positions. That is, there are multiple ways to fit a 2×3 rectangle inside region 522. In this implementation, the confidence value for each candidate position (comprised of multiple grid elements) may be represented by the sum, average, or some other function of the confidence values associated with the individual grid elements. For example, the confidence value of the candidate position defined by region 520 may be the sum of the confidence values associated with each grid element thereof. Thus, depending on the implementation, the output of pre-trained model 420 may need to be further processed to determine the confidence value associated with each candidate position.

In a further implementation, each grid element of the height map may be sized to approximate the length or width of base 302. Thus, each grid element of regions 520, 522, and 524 may represent a region able to fit therein the entirety of at least one of the length of width of base 302. In such a case, each grid element may be associated with a corresponding confidence value.

Notably, regions 520, 522, and 524 of FIGS. 5C and 5D are shown in black, while other aspects of these figures are shaded white, for clarity of illustration and not necessarily to indicate that pre-trained model 420 is configured to generate, for each grid element, a binary output. Instead, for example, each grid element of regions 520, 522, and 524 may have a corresponding confidence value that is above a threshold value (e.g., 50%) and may therefore be shaded black. Thus, grid elements that are shaded white may also, in some cases, constitute candidate positions, albeit with lower confidence values. Additionally, depending on how candidate regions are related to the grid elements (e.g., how many grid elements make up a candidate position), the shape of regions 520, 522, and/or 524 and/or the confidence values associated with the grid elements may be different than shown.

IV. Example Pre-trained Model

FIG. 6 illustrates an example artificial neural network (ANN) 600 that may make up pre-trained model 420. Notably, neural networks are well-adapted to generating transformations between two images (e.g., generating image of candidate positions based on height map). ANN 600 may include input nodes 611, 612, and 613 that form part of input layer 610 of ANN 600 and are configured to accept inputs $x_1$ and $x_2$ through $x_n$, respectively. In some embodiments, the number of inputs n may be equal to the sum of elements in the data that makes up (i) interaction point 400, (ii) height map 408, and (iii) robot structure 410 (when ANN 600 is not robot-specific). For example, height map 408 may be represented as a 2D image comprising M columns and N rows of pixels. Each of the M×N pixels may be associated with a corresponding value representing the height. Accordingly, ANN 600 may be configured to take height map 408 as input using M×N input nodes.

In another example, height map 408 may be provided to ANN 600 in the form of a 3D voxel grid having a height M, a width N, and a depth K. Each voxel of the 3D height map may be associated with a 0 value (voxel unoccupied) or a 1 value (voxel occupied). Accordingly, ANN 600 may be configured to take height map 408 as input using M×N×K input nodes. In further examples, ANN 600 may accept height map 408 formatted in different ways. Additionally, interaction point 400, robot structure 410, and other possible inputs may be provided as inputs by allocating one input node to each data element thereof. For example, coordinates 402 representing an x-position, a y-position, and a z-height may be allocated 3 additional input nodes.

ANN 600 may additionally include a plurality of hidden nodes that form part of one or more hidden layers 620 and 630. Hidden nodes 621, 622, 623, 624 and 625 may form first hidden layer 620 while hidden nodes 631, 632, 633, 634, and 635 may form second hidden layer 630. In some examples, ANN 600 may include additional hidden nodes and additional hidden layers not shown herein. The number of hidden nodes and hidden layers may be determined empirically during training of ANN 600 to achieve an ANN that determines candidate positions with a satisfactory accuracy (i.e., an accuracy greater than a threshold accuracy).

Notably, the terms "hidden node" and "hidden layer" are used herein to designate nodes and layers, respectively, located between the input and output layers of the ANN. These and similar terms are not to be construed as implying that values, functions, or other properties associated with the hidden nodes or layers are necessarily unknown or hidden.

ANN 600 may further include output nodes 641, 642, and 643 that form part of an output layer 640 of ANN 600. Output nodes 641, 642, and 643 may be configured to provide outputs $y_1$, $y_2$, and $y_m$, respectively. When the output of ANN 600 is a 2D image, the number of outputs m may be equal to the number of pixels in this image. The value associated with each pixel may represent, for example, the probability of successfully planning a collision-free trajectory if base 302 or a portion thereof is disposed at the corresponding location within the physical environment.

The nodes of ANN 600 may be connected with one another, as illustrated by the arrows in FIG. 6. For example, input nodes 611-613 may be connected to hidden nodes 621-625 of the first hidden layer 620 (i.e., input layer 610 may be connected to hidden layer 620), hidden nodes 621-625 may be connected to hidden nodes 631-635 of the second hidden layer 630 (i.e., hidden layer 620 may be connected to hidden layer 630), and hidden nodes 631-635 may be connected to output nodes 641-643 (i.e., hidden layer 630 may be connected to output layer 640). In some embodiments, each node of a layer may be connected to each node within a subsequent layer (e.g., node 624 may be connected to each of nodes 631-635). Alternatively, some nodes within a layer may be unconnected to one or more nodes within a subsequent layer. Some nodes may additionally be provided with a constant bias signal (not shown).

One or more of the hidden nodes may represent feature filters configured to filter the input sensor data for specific features (e.g., vertical lines, horizontal lines, curves, edges, etc.). The filters may become increasingly complex, filtering for higher-order features (e.g., tables, chairs, shelves, floors, etc.), as the hidden nodes of ANN 600 are traversed. In one example, hidden layer 620 may be configured to identify a plurality of positions that are not specific to a particular robot structure, interaction type, or object pose, among other factors. Hidden layer 630 may be configured to select therefrom candidate positions specific to a robotic device with a particular physical structure, a particular type of interaction, or a particular object pose, among other factors. Thus, updating ANN 600 to a robot with a new physical structure or a new type of interaction task may involve retraining hidden layer 630, but without needing to retrain the other layers 610, 620, and 640.

In further embodiments, nodes within a layer may be connected back to nodes within a previous layer or within the same layer. For example, node 635 within layer 630 may be connected to node 625 within prior layer 620 by way of connection 636. In another example, node 635 within layer 630 may be connected to at least one of nodes 631, 632, 633, or 634 within layer 630 (not shown). Thus, ANN 600 may include feedback that creates internal state within the network. This type of ANN may be referred to as a recurrent artificial neural network (RANN). Notably, an ANN without any feedback paths may be referred to as a feedforward artificial neural network (FF-ANN).

Each connection between nodes of ANN 600 may be associated with a respective weighting value. A given node may receive inputs $a_1$, $a_2$, through $a_k$. Each of inputs $a_1$, $a_2$, through $a_k$ may be associated with corresponding weighting values $w_1$, $w_2$, through $w_k$, respectively. The given node may operate by first taking the sum of the respective products of each input multiplied by the corresponding weighting value. The given node may thus compute the sum $\varphi = w_1 a_1 + w_2 a_2 + + w_k a_k$. The sum $\varphi$ may then be passed through an activation function to produce the output of the given node. Example activation functions may include a linear activation function where the node output is linearly proportional to the sum $\varphi$, a Gaussian activation function where the node output is normally distributed along a bell curve according to the sum $\varphi$, a sigmoidal activation function where the sum $\varphi$ is mapped to a bounded range of node outputs, or a Rectified Linear Units (RELu) function where the node output is max $(0, \varphi)$.

In some embodiments, ANN 600 may be or may include therein aspects of a convolutional artificial neural network (CANN). For example, ANN 600 may include pooling layers (i.e., downsampling layers) between layers 610, 620, 630, and 640. Further, ANN 600 may additionally include aspects of probabilistic neural networks, time-delay neural networks, regulatory feedback neural networks, and spiking neural networks, among other types of neural networks not herein discussed.

The output of the given node may be provided as input to other nodes within ANN 600. At each respective node to which the output of the given node is connected, this output may be multiplied by a corresponding weighting value and summed along with other inputs to the respective node. For example, the output of node 621 may be provided to node 635. The output of node 621 may be multiplied by a weighting value associated with the connection between node 621 and 635. This product may then be summed at node 635 along with the product of the output of node 622 and the weighting value between node 622 and node 635, the product of the output of node 623 and the weighting value between node 623 and node 635, the product of the output of node 624 and the weighting value between node 624 and node 635, and the product of the output of node 625 and the weighting value between node 625 and node 635. The sum may be passed through an activation function to determine the output of node 635. The output of node 635 may then be provided to nodes 641, 642, and 643.

The weighting values between interconnected nodes may be determined by training ANN 600 based on a plurality of sample height maps containing respective interaction points and validated positions determined therefor, among other training data that may be associated therewith (e.g., data indicating the structure of the robot to which the validated positions correspond). The training of ANN 600 may be performed by, for example, backpropagation (e.g., classical backpropagation, backpropagation with momentum, Gauss-Jacobi backpropagation, Gauss-Seidel backpropagation, etc.).

Generally, ANN 600 may be configured to accept as input and determine candidate positions based on the type of data with which it is trained. Thus, for example, an ANN trained using a data set that includes (i) a plurality of height maps, (ii) validated positions within these height maps, (iii) designated interaction points within the height maps, and (iv) an indication of a structure of the robots for which a given validated position is satisfactory, may accept as input and determine candidate positions based on a height map having designated therein an interaction point and data indicating a physical structure of the robot for which the candidate positions are to be determined.

Notably, the trained ANN 600 may determine candidate positions within physical environments that it has not previously encountered or trained on. The ANN may determine candidate positions that, based on the training data, are similar to the validated positions in the sample height maps. For example, the ANN may determine candidate positions that are accessible by base 302, large enough to accommodate the size of base 302, and allow at least a threshold distance between objects with which manipulator 304 can collide, among other considerations.

V. Example Model Training Operations

Figure 7:
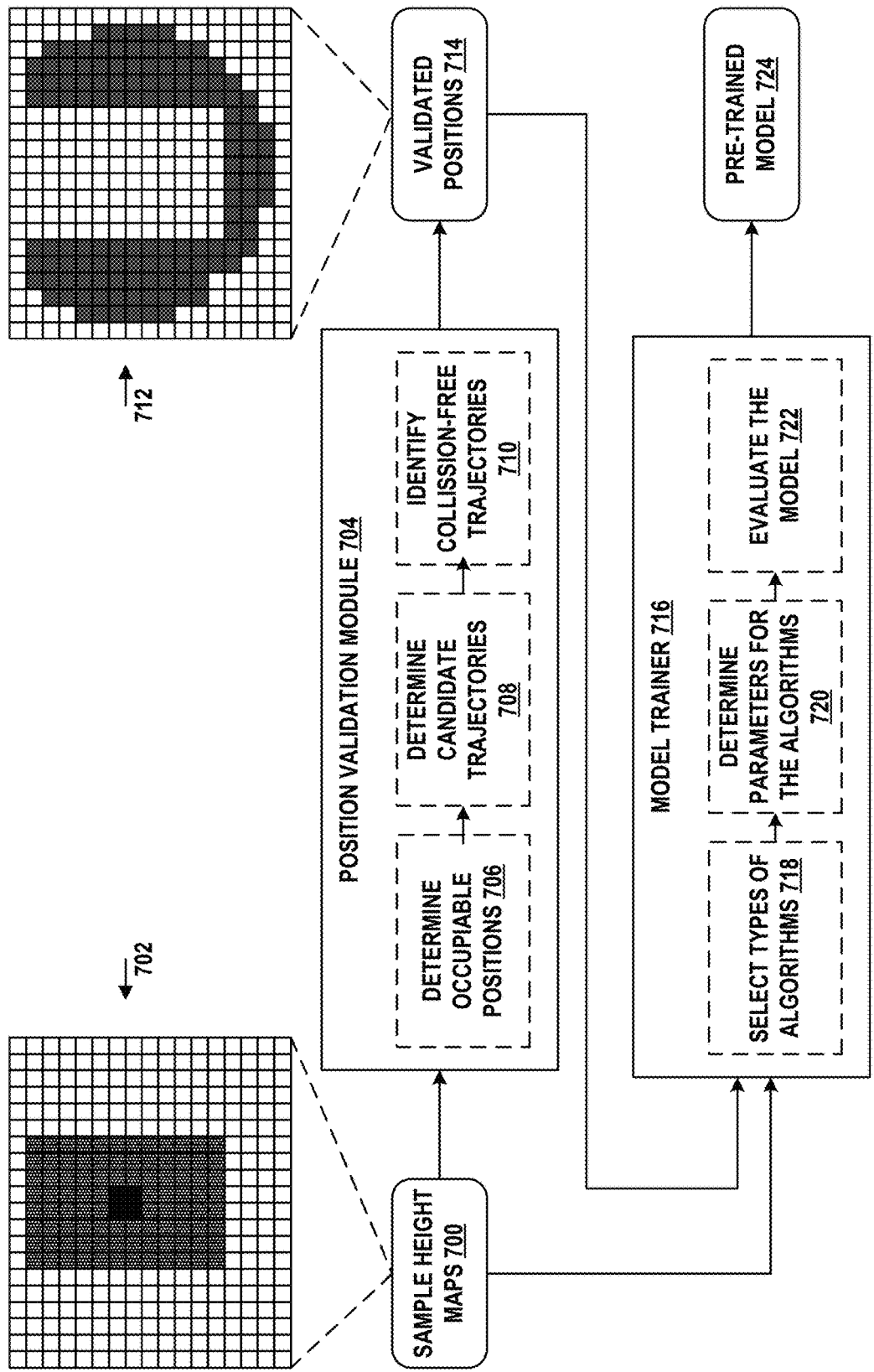
FIG. 7 illustrates a system for training a predictive model, in accordance with example embodiments.

FIG. 7 illustrates an example system for generating a pre-trained model (i.e., training the model). The system includes position validation module 704 and model trainer 716. Position validation module 704 is configured to take as input sample height maps 700, of which height map 702 is an example. Sample height maps 700 may represent a plurality of different environments, which may be real-world physical environments or simulated physical environments generated for the purpose of training the model. Sample height maps 700 may include, for example, 10,000 different height maps. Each of sample height maps 700 may contain therein one or more interaction points for a robot. Height map 702 illustrates an environment containing therein a table with an interaction point in the center thereof.

Position validation module may be configured to process sample height maps 700 off-line and identify therein validated positions 714. Validated positions 714 may represent positions within the corresponding physical environment that, when occupied by a base of the robot, allow a manipulator of the robot to follow a collision-free trajectory to reach the interaction point in the corresponding physical environment. In some implementations, because validated positions 714 may be computed off-line (i.e., while the robotic device is not actively operating) with little to no time limit, the validated positions for a given sample height map may represent every possible base position that allows for a collision-free trajectory to be planned for the manipulator. That is, validated positions 714 may represents a complete solution set associated with sample height maps 700 and therefore provide a complete and accurate training set for model trainer 716.

Grid 712 illustrates a set of validated positions corresponding to height map 702. The validated positions are indicated by a dark shading of the corresponding grid elements. Similarly to FIGS. 5C and 5D, the validated positions corresponding to height map 702 are found approximately within a circle having a radius defined by the reach of the manipulator. However, whereas the candidate positions shown in FIGS. 5C and 5D are predicted to allow for a collision-free trajectory to be planned, the validated positions shown in grid 712 are guaranteed to allow for a collision-free trajectory to be planned. In other words, a position in grid 712 is labeled as a validated position after one or more collision-free trajectories are planned therefor, whereas a position in FIG. 5C is labeled as a candidate position when it is predicted that one or more collision-free trajectories may be planned therefor.

Position validation module 704 may identify validated positions 714 by determining, for each of sample height maps 700, positions that are occupiable by the base of the robot, as indicated by block 706. This may involve, for example, identifying regions within the height map that are (i) traversable by the base or the robot (e.g., have a height gradient that does not exceed a threshold value) and (ii) large enough to accommodate the base without colliding with other physical features (determined, e.g., by convolving the height map using a convolution kernel having a size that approximates the size of the base). For each of the occupiable positions determined at block 706, position validation module 704 may then determine a plurality of candidate trajectories for the manipulator to follow to reach the respective interaction point, as indicated by block 708. Trajectory planning may utilize any of a number of trajectory planning approaches such as polynomial fitting or genetic algorithms, among other possibilities.

From these candidate trajectories, position validation module 704 may identify trajectories that are collision-free, as indicated by block 710. A trajectory may be collision-free when, while being followed by the manipulator, the manipulator, the end effector, and other portions of the robot (i) do not intersect with any features within the physical environment or (ii) do not come within a threshold distance of any features within the physical environment (aside from the interaction point). Notably, when sample height maps 700 are three-dimensional, planning and evaluation of the trajectories may be carried out using sample height maps 700. Alternatively, when sample height maps 700 are two-dimensional, planning and evaluation of the trajectories may be carried out using 3D representations (not shown) of the environments represented by sample height maps 700.

In some implementations, the operations of blocks 708 and 710 may be combined. That is, trajectory planning may be carried out with various constraints that result in avoidance of collisions, thereby resulting in any planned trajectories being free of collisions. Such an implementation thus might not be able to determine any trajectories under some conditions, indicating that no collision-free trajectories are available.

Additionally, in cases where pre-trained model 724 is specific to a robot having a particular physical structure, the operations of position validation module 704 may be specific to that robot. In cases where pre-trained model 724 is to take into account different physical structures of different robots, the operations of validation module 704 may be carried out for the different physical structures. There may thus be multiple sets of validated positions for each sample height map, with each set representing the validated positions that will allow a robot with a particular physical structure to reach the respective interaction point.

Once validated positions 714 are determined, validated positions 714 and sample height maps 700 may be provided as input to model trainer 716 to be used in generating pre-trained model 724. Pre-trained model 724 may correspond to pre-trained model 420 of FIG. 4. Generation, or training, of model 724 may involve selecting one or more types of algorithms to be used for model 724, as indicated by block 718. In one example, the model may be an ANN, as discussed with respect to FIG. 6. However, model 724 may additionally or alternatively include a combination of one or more of linear regression, logistic regression, linear discriminant analysis, classification or decision trees, naive Bayes, k-nearest neighbors, learning vector quantization, support vector machines, random forests, and boosting, among other possibilities. These algorithms may be structured or combined into a pipeline, or series, that collectively carries out functions associated with predicting candidate positions within a variety of different environments. The types of algorithms and their arrangements may be user-specified or selected automatically by model trainer 716.

Once the type and arrangement of algorithms is selected to form the general structure of the model, the algorithms that make up the model may be trained using sample height maps 700, validated positions 714, and other data (e.g., different possible robot physical structures) in order to determine the parameters that will result in the algorithms predicting candidate positions, as indicated by block 720. In the case of an ANN, for example, the parameters may include the number of hidden layers and the weights associated with connections between nodes, which may be determined using, for example, backpropagation.

Once the parameters are determined, pre-trained model 724 may be evaluated using one or more test cases to determine whether pre-trained model 724 performs as expected, as indicated by block 722. The test cases may include height maps with known validated positions but which have not been used during training. For example, evaluation of pre-trained model 724 may involve determining whether the model correctly predicts at least a threshold fraction of candidate positions in each of the test height maps or whether the model has a false-positive detection rate no larger than a threshold value. Other evaluation metrics are possible.

Once pre-trained model 724 is successfully evaluated, it may be used as part of the system of FIG. 4. If pre-trained model 724 does not perform to a satisfactory standard, the operations of one or more of blocks 718 or 720 may be repeated to refine pre-trained model 724.

In some embodiments, as robots operate in various physical environments, the sensor data gathered thereby may be used to generate additional sample height maps 700. For example, robotic devices utilizing pre-trained model 724 may store various height maps used thereby to navigate. These height maps may be compiled and used to augment the size of the training data for pre-trained model 724. In turn, model 724 may be periodically revised and adjusted based on this additional training data to make more accurate predictions. An updated version of pre-trained model 724 may be periodically provided to the robotic devices as part of a software update, for example.

VI. Additional Example Operations

Figure 8:
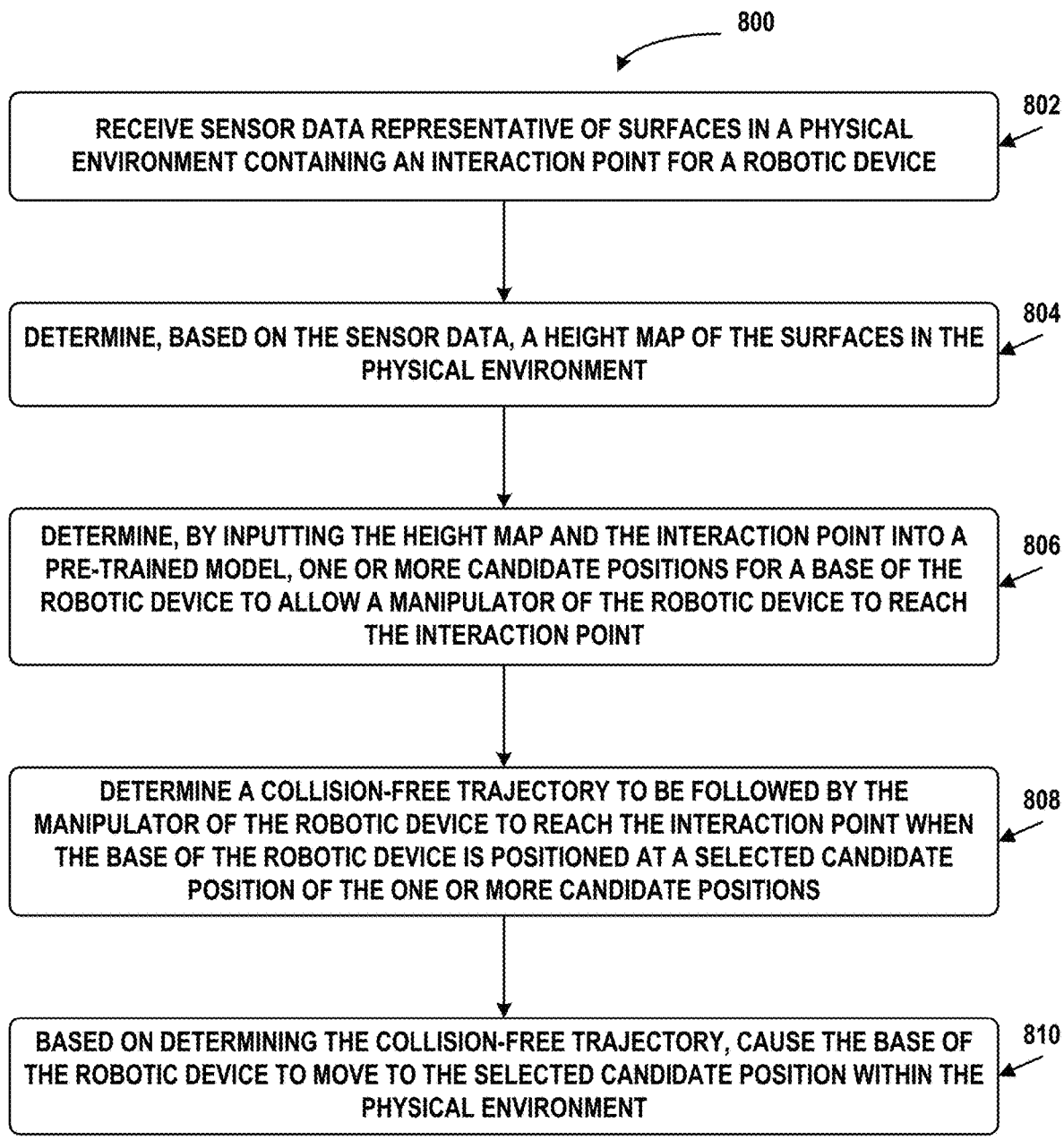
FIG. 8 illustrates a flow chart, in accordance with example embodiments.

FIG. 8 illustrates flow chart 800 of operations related to determining a position for a base of a robot that allows the robot to operate on a particular interaction point within an environment. The operations may be carried out by robotic system 100, robotic arm 200, robot 300, control systems thereof, or other computing devices associated therewith. The operations may be similar to and may include variations of the operations discussed with respect to FIGS. 3-7.

Block 802 may involve receiving sensor data representative of surfaces in a physical environment containing an interaction point for a robotic device.

Block 804 may involve determining, based on the sensor data, a height map of the surfaces in the physical environment.

Block 806 may involve determining, by inputting the height map and the interaction point into a pre-trained model, one or more candidate positions for a base of the robotic device to allow a manipulator of the robotic device to reach the interaction point.

Block 808 may involve determining a collision-free trajectory to be followed by the manipulator of the robotic device to reach the interaction point when the base of the robotic device is positioned at a selected candidate position of the one or more candidate positions.

Block 810 may involve, based on determining the collision-free trajectory, causing the base of the robotic device to move to the selected candidate position within the physical environment.

In some embodiments, the pre-trained model may be trained by operations that include determining a plurality of sample height maps each representing surfaces in a corresponding physical environment that contains therein a respective interaction point for the robotic device. The operations may also include determining, for each of the plurality of sample height maps, one or more validated positions for the base that allow the manipulator to follow at least one collision-free trajectory to the respective interaction point. The operations may further include determining, based on (i) the plurality of sample height maps, (ii) the one or more validated positions determined for each of the plurality of sample height maps, and (iii) the respective interaction point represented in each of the plurality of sample height maps, the pre-trained model.

In some embodiments, determining the one or more validated positions for the base of the robotic device comprises may include determining, for each of the plurality of sample height maps, a plurality of positions that (i) the robotic device can occupy within the corresponding physical environment and (ii) place the respective interaction point within reach of the manipulator. For each respective position of the plurality of positions, one or more candidate trajectories may be determined for the manipulator to follow to the respective interaction point while the base is disposed at the respective position. It may be determined that at least one of the one or more candidate trajectories is free of collisions. Based on determining that the at least one of the one or more candidate trajectories is free of collisions, the respective position may be selected as one of the one or more validated positions.

In some embodiments, the height map may be a two-dimensional height map. Determining the height map may include determining, based on the sensor data, a three-dimensional representation of the surfaces in the physical environment. From the three-dimensional representation of the surfaces, surfaces may be selected that are above a first height threshold and below a second height threshold. The second height threshold may be greater than the first height threshold. The two-dimensional height map may be generated based on the selected surfaces.

In some embodiments, the collision-free trajectory to be followed by the manipulator may be determined based on the three-dimensional representation of the surfaces in the physical environment.

In some embodiments, the height map may be a three-dimensional voxel grid. Each voxel may indicate whether a portion of the physical environment represented thereby is occupied.

In some embodiments, the pre-trained model may be configured to determine, for each of the one or more candidate positions, a corresponding confidence value. A first candidate position may be selected that has a highest corresponding confidence value of the one or more candidate positions. One or more candidate trajectories may be selected to be followed by the manipulator to reach the interaction point when the base is positioned at the first candidate position. It may be determined whether at least one of the one or more candidate trajectories is free of collisions. When the at least one of the one or more candidate trajectories is free of collisions, the collision-free trajectory to be followed by the manipulator may be selected from the at least one of the one or more candidate trajectories. When the at least one of the one or more candidate trajectories is not free of collisions, another candidate position may be selected for collision testing. The another candidate position may have a highest corresponding confidence value of any untested candidate positions of the one or more candidate positions.

In some embodiments, the pre-trained model may be configured to determine, for each of the one or more candidate positions, a corresponding confidence value. A candidate position having a highest corresponding confidence value of the one or more candidate positions may be selected. The base may be caused to move toward the selected candidate position before the collision-free trajectory to be followed by the manipulator is determined.

In some embodiments, the pre-trained model may be configured to determine, for each of the one or more candidate positions, a corresponding confidence value. A gradient of the corresponding confidence values across the one or more candidate positions may be determined. The gradient may define, for each pair of neighboring candidate positions of the one or more candidate positions, a difference between the corresponding confidence values of the neighboring candidate positions. Before determining the collision-free trajectory to be followed by the manipulator, the base may be caused to move in a direction associated with a highest value of the gradient.

In some embodiments, updated sensor data representative of the surfaces in the physical environment may be received. Based on the updated sensor data, an updated height map of the surfaces in the physical environment may be determined. An updated corresponding confidence value for each of the one or more candidate positions may be determined by inputting the updated height map into the pre-trained model. An updated gradient of the updated corresponding confidence values across the one or more candidate positions may be determined. A direction of motion of the base may be adjusted based on the updated gradient while determining the collision-free trajectory to be followed by the manipulator.

In some embodiments, the pre-trained model may be an artificial neural network (ANN).

In some embodiments, the ANN may include one or more first layers configured to determine a plurality of candidate positions for respective bases of a plurality of different robotic devices each having a different physical structure. The plurality of different robotic devices may include the robotic device. The ANN may also include one or more second layers configured to select, from the plurality of candidate positions, the one or more candidate positions for the base of the robotic device based on a physical structure of the robotic device.

In some embodiments, the pre-trained model may be further configured to determine the one or more candidate positions based on (i) a pose of an object disposed at the interaction point and (ii) a pose of an end effector connected to the manipulator and configured to interact with the object. Accordingly, the one or more candidate positions may be determined by inputting into the pre-trained model (i) the pose of the object disposed at the interaction point and (ii) the pose of the end effector connected to the manipulator and configured to interact with the object.

VII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method comprising:
   obtaining a map of a physical environment that contains an interaction point for a manipulator of a robotic device;
   determining, using a machine learning model and based on (i) the map, (ii) the interaction point, and (iii) a representation of a physical structure of the robotic device, a plurality of candidate positions for a base of the robotic device within the physical environment represented by the map, wherein each respective candidate position of the plurality of candidate positions is predicted to allow the manipulator of the robotic device to follow at least one collision-free trajectory relative to the base of the robotic device to reach the interaction point when the base of the robotic device is positioned at the respective candidate position;
   selecting a candidate position from the plurality of candidate positions; and based on selecting the candidate position, causing the base of the robotic device to move toward the selected candidate position within the physical environment.

2. The computer-implemented method of claim 1, wherein the machine learning model is configured to generate candidate positions for a plurality of different robotic devices having a plurality of different physical structures, wherein the robotic device is one of the plurality of different robotic devices, and wherein each of (i) the map, (ii) the interaction point, and (iii) the representation of the physical structure of the robotic device is provided as input to and processed by the machine learning model to generate the plurality of candidate positions.

3. The computer-implemented method of claim 2, wherein the machine learning model comprises:
one or more first layers configured to determine, based on (i) the map and (ii) the interaction point, a second plurality of candidate positions for respective bases of the plurality of different robotic devices; and
one or more second layers configured to select, from the second plurality of candidate positions and based on the representation of the physical structure of the robotic device, the plurality of candidate positions for the base of the robotic device.

4. The computer-implemented method of claim 1, wherein the representation of the physical structure of the robotic device indicates a physical structure of one or more of: (i) the manipulator, (ii) an end effector connected to the manipulator, or (iii) the base.

5. The computer-implemented method of claim 1, wherein the machine learning model is trained by operations comprising:
determining a plurality of sample maps each representing a corresponding physical environment that contains therein a respective interaction point;
determining, for each of the plurality of sample maps, validated positions for corresponding bases of a plurality of robotic devices with different physical structures, wherein each respective validated position of the validated positions allows a corresponding manipulator of at least one robotic device of the plurality of robotic devices to follow a collision-free trajectory to the respective interaction point; and
determining parameters of the machine learning model based on (i) the plurality of sample maps, (ii) the validated positions determined for each of the plurality of sample maps, (iii) the respective interaction point in each of the plurality of sample maps, and (iv), for each respective robotic device of the plurality of robotic devices, a corresponding representation of a physical structure of the respective robotic device.

6. The computer-implemented method of claim 5, wherein determining the validated positions for the respective bases comprises:
determining, for each of the plurality of sample maps, a plurality of positions that (i) the at least one robotic device can occupy within the corresponding physical environment and (ii) place the respective interaction point within reach of the corresponding manipulator;
determining, for each respective position of the plurality of positions, one or more candidate trajectories for the corresponding manipulator to follow to the respective interaction point while the corresponding base of the at least one robotic device is disposed at the respective position;
determining that at least one of the one or more candidate trajectories is free of collisions; and
based on determining that the at least one of the one or more candidate trajectories is free of collisions, selecting the respective position as one of the validated positions.

7. The computer-implemented method of claim 1, wherein the map represents a top-down view of the physical environment divided into a grid comprising a plurality of cells, and wherein each respective cell of the plurality of cells comprises a corresponding value that indicates a height of a physical feature present in an area of the physical environment represented by the respective cell.

8. The computer-implemented method of claim 1, wherein the map comprises a two-dimensional map, and wherein obtaining the map comprises:
receiving sensor data that represents the physical environment;
determining, based on the sensor data, a three-dimensional representation of the physical environment;
selecting, from the three-dimensional representation, physical features that are above a first height threshold and below a second height threshold, wherein the second height threshold is greater than the first height threshold; and
generating the two-dimensional map based on the selected physical features.

9. The computer-implemented method of claim 1, wherein the map comprises a three-dimensional voxel grid, and wherein each respective voxel of the three-dimensional voxel grid indicates whether a portion of the physical environment represented thereby is occupied.

10. The computer-implemented method of claim 1, further comprising:
determining a collision-free trajectory to be followed by the manipulator relative to the base of the robotic device to reach the interaction point when the base of the robotic device is positioned at the selected candidate position; and
causing the base of the robotic device to move to the selected candidate position based on determining the collision-free trajectory.

11. The computer-implemented method of claim 10, wherein determining the collision-free trajectory comprises:
determining one or more candidate trajectories to be followed by the manipulator to reach the interaction point when the base is positioned at the selected candidate position;
determining whether at least one of the one or more candidate trajectories is free of collisions;
based on determining that the at least one of the one or more candidate trajectories is free of collisions, selecting, from the at least one of the one or more candidate trajectories, the collision-free trajectory to be followed by the manipulator; and
based on determining that the at least one of the one or more candidate trajectories is not free of collisions, selecting another candidate position for collision testing.

12. The computer-implemented method of claim 1, wherein the machine learning model is configured to generate, for each respective candidate position of the plurality of candidate positions, a corresponding confidence value indicative of a likelihood that the respective candidate position will allow the manipulator to follow the at least one collision-free trajectory, and wherein selecting the candidate position comprises:

selecting, from the plurality of candidate positions, a candidate position having a highest corresponding confidence value.

13. The computer-implemented method of claim 1, wherein the machine learning model is configured to generate, for each respective candidate position of the plurality of candidate positions, a corresponding confidence value indicative of a likelihood that the respective candidate position will allow the manipulator to follow the at least one collision-free trajectory, and wherein selecting the candidate position comprises:
determining a gradient of the corresponding confidence values across the plurality of candidate positions, wherein the gradient defines, for each pair of neighboring candidate positions of the plurality of candidate positions, a difference between the corresponding confidence values of the neighboring candidate positions; and
selecting, based on the gradient, one or more intermediate positions across which to move the base before reaching the selected candidate position.

14. The computer-implemented method of claim 1, wherein the machine learning model comprises an artificial neural network (ANN).

15. The computer-implemented method of claim 1, wherein the plurality of candidate positions is determined further based on a pose of an object disposed at the interaction point.

16. A system comprising:
a processor; and
a non-transitory computer-readable storage medium having stored thereon instructions that, when executed by the processor, cause the processor to perform operations comprising:
obtaining a map of a physical environment that contains an interaction point for a manipulator of a robotic device;
determining, using a machine learning model and based on (i) the map, (ii) the interaction point, and (iii) a representation of a physical structure of the robotic device, a plurality of candidate positions for a base of the robotic device within the physical environment represented by the map, wherein each respective candidate position of the plurality of candidate positions is predicted to allow the manipulator of the robotic device to follow at least one collision-free trajectory relative to the base of the robotic device to reach the interaction point when the base of the robotic device is positioned at the respective candidate position;
selecting a candidate position from the plurality of candidate positions; and
based on selecting the candidate position, causing the base of the robotic device to move toward the selected candidate position within the physical environment.

17. The system of claim 16, wherein the machine learning model is configured to generate candidate positions for a plurality of different robotic devices having a plurality of different physical structures, wherein the robotic device is one of the plurality of different robotic devices, and wherein each of (i) the map, (ii) the interaction point, and (iii) the representation of the physical structure of the robotic device is provided as input to and processed by the machine learning model to generate the plurality of candidate positions.

18. The system of claim 16, wherein the representation of the physical structure of the robotic device indicates a physical structure of one or more of: (i) the manipulator, (ii) an end effector connected to the manipulator, or (iii) the base.

19. The system of claim 16, wherein the map represents a top-down view of the physical environment divided into a grid comprising a plurality of cells, and wherein each respective cell of the plurality of cells comprises a corresponding value that indicates a height of a physical feature present in an area of the physical environment represented by the respective cell.

20. A non-transitory computer-readable storage medium having stored thereon instructions that, when executed by a computing device, cause the computing device to perform operations comprising:
obtaining a map of a physical environment that contains an interaction point for a manipulator of a robotic device;
determining, using a machine learning model and based on (i) the map, (ii) the interaction point, and (iii) a representation of a physical structure of the robotic device, a plurality of candidate positions for a base of the robotic device within the physical environment represented by the map, wherein each respective candidate position of the plurality of candidate positions is predicted to allow the manipulator of the robotic device to follow at least one collision-free trajectory relative to the base of the robotic device to reach the interaction point when the base of the robotic device is positioned at the respective candidate position;
selecting a candidate position from the plurality of candidate positions; and
based on selecting the candidate position, causing the base of the robotic device to move toward the selected candidate position within the physical environment.

* * * * *